(12) United States Patent
Zhao et al.

(10) Patent No.: US 12,442,959 B2
(45) Date of Patent: Oct. 14, 2025

(54) COLOR-ROUTERS FOR IMAGE SENSING

(71) Applicant: The Board of Trustees of the Leland Stanford Junior University, Stanford, CA (US)

(72) Inventors: Nathan Zhao, Stanford, CA (US); Peter B. Catrysse, Redwood City, CA (US); Shanhui Fan, Stanford, CA (US)

(73) Assignee: The Board of Trustees of the Leland Stanford Junior University, Stanford, CA (US)

(*) Notice: Subject to any disclaimer, the term of this patent is extended or adjusted under 35 U.S.C. 154(b) by 0 days.

(21) Appl. No.: 18/030,126

(22) PCT Filed: Nov. 2, 2021

(86) PCT No.: PCT/US2021/057693
§ 371 (c)(1),
(2) Date: Apr. 4, 2023

(87) PCT Pub. No.: WO2022/094453
PCT Pub. Date: May 5, 2022

(65) Prior Publication Data
US 2023/0417960 A1    Dec. 28, 2023

Related U.S. Application Data

(60) Provisional application No. 63/108,622, filed on Nov. 2, 2020.

(51) Int. Cl.
G02B 5/02 (2006.01)
G02B 5/20 (2006.01)
(Continued)

(52) U.S. Cl.
CPC ........... *G02B 5/0247* (2013.01); *G02B 5/201* (2013.01); *G02B 27/0012* (2013.01);
(Continued)

(58) Field of Classification Search
CPC .............. G02B 5/0247; G02B 27/0012; G02B 27/1013; G02B 5/201; G02B 2207/101; H01L 27/14621; H10F 39/8053
See application file for complete search history.

(56) References Cited

U.S. PATENT DOCUMENTS 8,101,903 B2 * 1/2012 Mokhnatyuk ......... H10F 39/024
257/435
10,483,309 B1 * 11/2019 Lee .................... H01L 27/14627
(Continued)

FOREIGN PATENT DOCUMENTS

EP     3217196    9/2017

OTHER PUBLICATIONS

Authorized Officer: Shane Thomas, International Search Report and Written Opinion issued in PCT application No. PCT/US2021/057693, Feb. 16, 2022, 9 pp.
(Continued)

*Primary Examiner* — Jennifer D Bennett
(74) *Attorney, Agent, or Firm* — Kaplan Breyer Schwarz, LLP

(57) ABSTRACT

The present disclosure is directed toward systems for providing color-selective light detection and/or image sensing in a substantially lossless manner, thereby providing higher and up to nearly perfect optical efficiency. Embodiments disclosed herein include a plurality of pixel-repeat units, each including a color router that is configured to selectively route photons of each wavelength signal in a light signal to a different photodetector of the pixel-repeat unit. In some embodiments, the color router also functions as an anti-reflection coating that mitigates reflection of incident light, as well as a lensing system that directs substantially all photons of each wavelength signal only to their corresponding photodetector. As a result, the photodetectors collect more light than possible using prior-art absorptive color
(Continued)

filters, thereby enabling smaller photodetectors to be used. Therefore, scaling of image sensor photodetectors to sub-wavelength sizes is possible.

13 Claims, 18 Drawing Sheets

(51) Int. Cl.
    *G02B 27/00*     (2006.01)
    *G02B 27/10*     (2006.01)
    *H10F 39/00*     (2025.01)

(52) U.S. Cl.
    CPC ..... *G02B 27/1013* (2013.01); *H10F 39/8053* (2025.01); *G02B 2207/101* (2013.01)

(56) References Cited

U.S. PATENT DOCUMENTS

| | | | | |
|---|---|---|---|---|
| 2004/0120644 A1* | 6/2004 | Chou | ............... | G02B 6/138 |
| | | | | 385/129 |
| 2011/0267487 A1* | 11/2011 | Yamagata | ......... | H01L 27/14627 |
| | | | | 359/569 |
| 2012/0013989 A1 | 1/2012 | Choi et al. | | |
| 2014/0071316 A1* | 3/2014 | Asano | ................ | G02B 13/001 |
| | | | | 348/270 |
| 2016/0064448 A1 | 3/2016 | Shin | | |
| 2017/0090206 A1* | 3/2017 | Kim | ................ | H01L 27/14627 |
| 2017/0261368 A1* | 9/2017 | Nam | ................ | G02B 5/201 |
| 2018/0184052 A1* | 6/2018 | Sato | ................ | G02F 1/133504 |
| 2020/0124866 A1 | 4/2020 | Camayd-Munoz et al. | | |
| 2020/0266230 A1 | 8/2020 | Miyata et al. | | |

OTHER PUBLICATIONS

Camayd-Munoz, P et al., "Multifunctional volumetrc meta-optics for color and polarization image sensors", Optica, Online, Mar. 31, 2020, DOI: https://doi.org/10.1364/OPTICA.384228, 9 pp., vol. 7, No. 4.

Zhao, N et al., "Perfect RGB-IR Color Routers for Sub-Wavelength Size CMOS Image Sensor Pixels", Advanced Photonics Research, Nov. 16, 2020, DOI: 10.10002/adpr.202000048, 10 pp., vol. 2, No. 3.

European Search Report issued in related EP Patent Application 21887764.5 on Sep. 9, 2024.

* cited by examiner

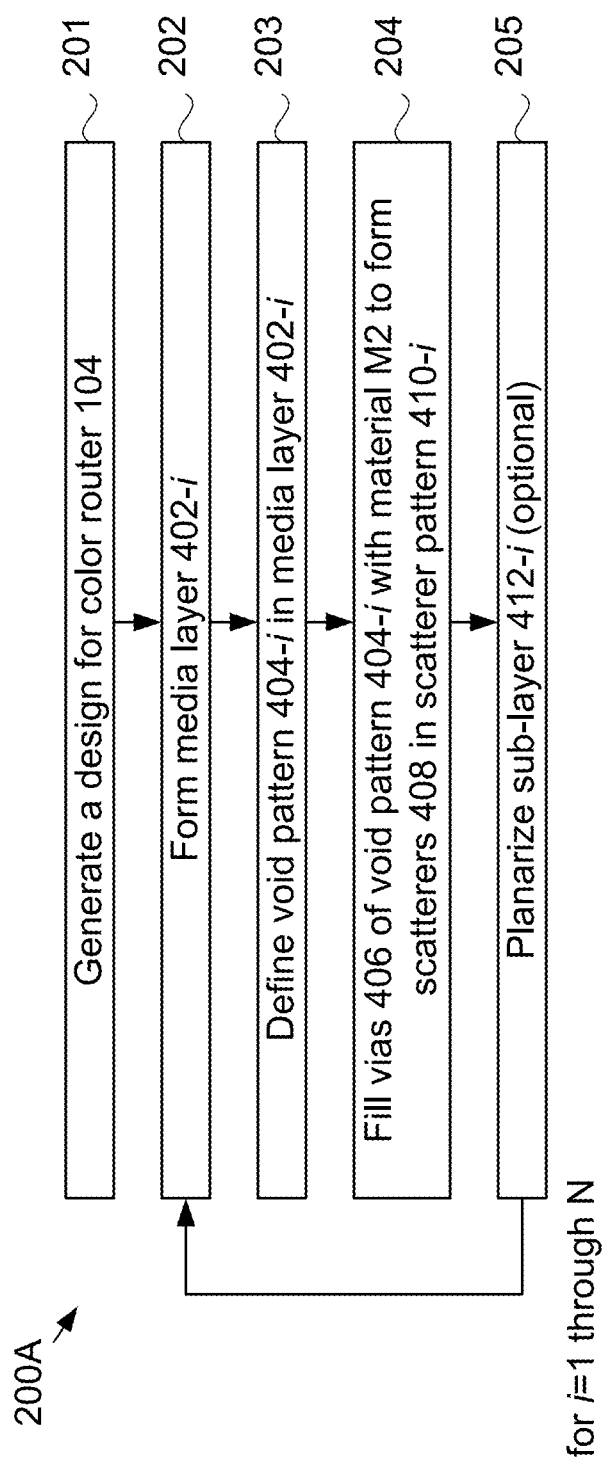
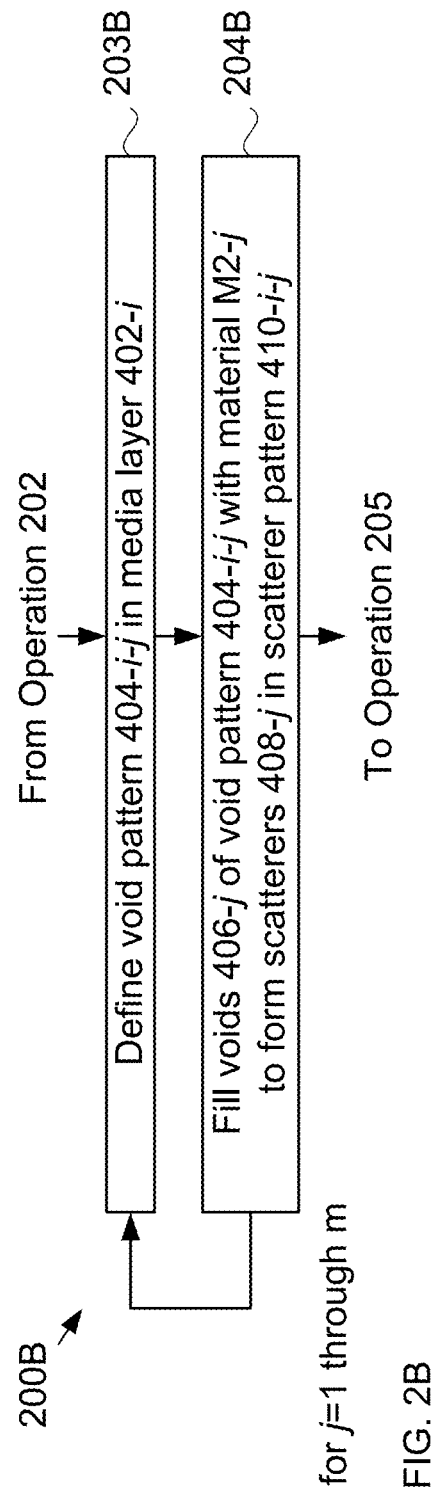

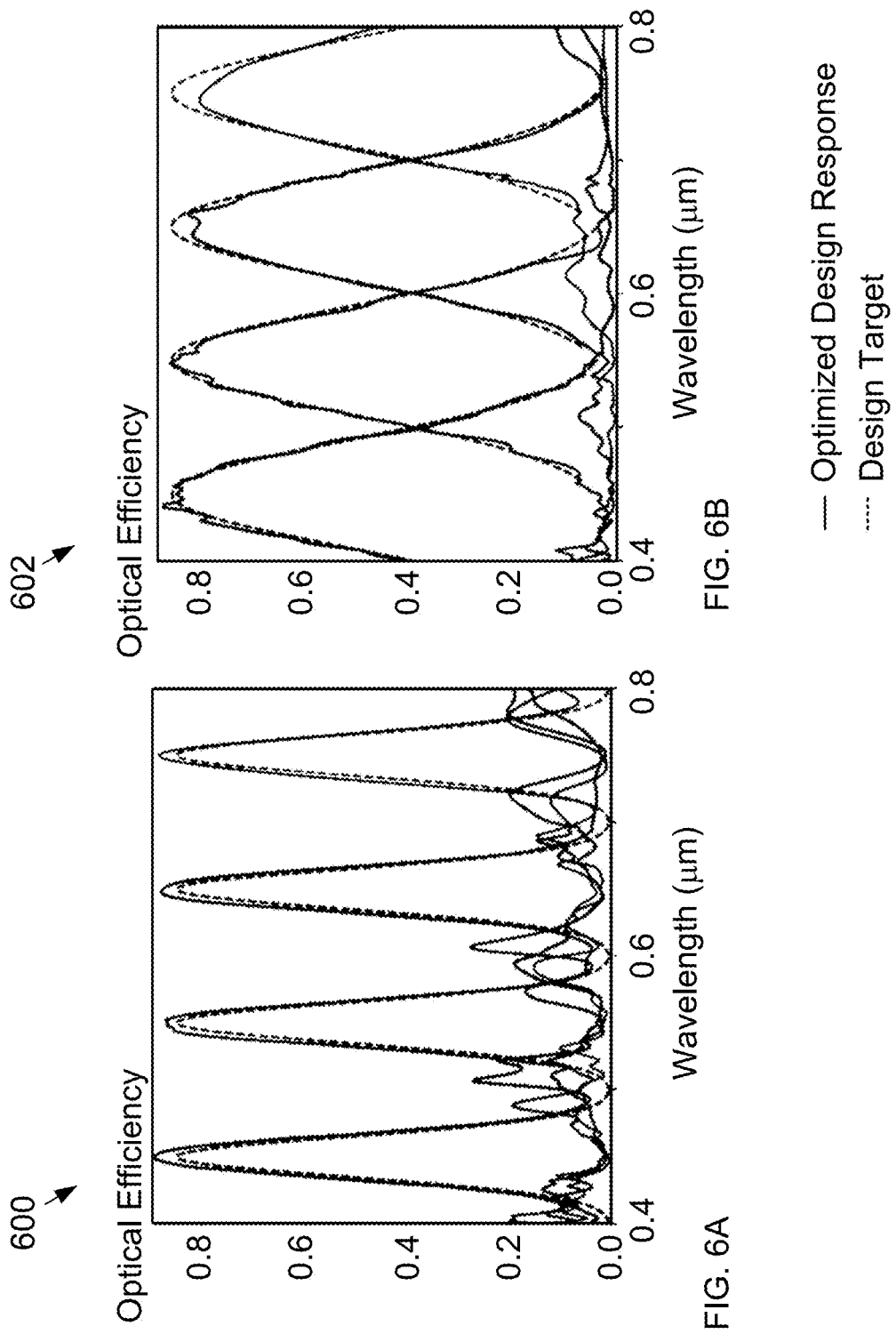

COLOR-ROUTERS FOR IMAGE SENSING

CROSS REFERENCE TO RELATED APPLICATIONS

This case claims priority of U.S. Provisional Patent Application Ser. No. 63/108,622, filed Nov. 2, 2020, which is incorporated herein by reference. If there are any contradictions or inconsistencies in language between this application and one or more of the cases that have been incorporated by reference that might affect the interpretation of the claims in this case, the claims in this case should be interpreted to be consistent with the language in this case.

TECHNICAL FIELD

The present disclosure relates to image sensing in general, and, more particularly, to spectral and color management in image sensing applications.

BACKGROUND

High resolution image sensing technologies have exploded over the past decade. An important capability of all image sensors is to separate light into individual wavelength signals (each comprising a single wavelength component or multiple wavelength components) for detection by photodetectors located in corresponding pixels and/or sub-pixels. In most technologies today, this separation is done via absorbing color filters (e.g., blue, green, and red), which selectively transmit light in a desired wavelength band while absorbing all other light. Unfortunately, such filters have several significant drawbacks.

First, because optical energy outside the wavelength range of interest is absorbed, color filters intrinsically waste a significant amount of the light incident upon them—more than two-thirds in some cases.

Second, this absorption significantly reduces the total amount of light received at the pixel photodetectors, which degrades image-sensor performance.

Third, the amount of light incident on each an image-sensor pixel reduces quadratically with linear scaling of pixel size; therefore, the reduction in intensity of light at the photodetectors due to absorption by the color filters represents a bottleneck to scaling of pixel size for prior-art image sensors. This is particularly detrimental to the performance of pixels having sizes at or below the wavelength of the light they receive.

The need for a color-separation capability for image processors that enables small pixel size and/or high image-sensor performance remains, as yet, unmet in the prior-art.

SUMMARY

An advance in the art is made according to aspects of the present disclosure which describes systems and apparatus for providing color selectivity in a substantially lossless manner (i.e., without significant absorption of incident light). Color-routers in accordance with the present disclosure selectively directly route virtually all photons of each given wavelength signal in a received light signal to only the photodetector of a plurality of photodetectors meant to receive that wavelength signal. This allows the use of smaller photodetectors because they collect more light than larger photodetectors coupled with color filters. As a result, image sensors in accordance with the present disclosure can be scaled to sizes heretofore unattainable by using photodetectors that are sub-wavelength in size.

An illustrative embodiment of the present disclosure is an image sensor comprising a plurality of pixel-repeat units, where each pixel-repeat unit includes a color-router disposed on a light-detection layer. The light-detection layer includes first, second, third, and fourth photodetectors, which are substantially identical and arranged in linear array. The color router covers these photodetectors, and is configured to receive light containing a plurality of wavelength signals and directly route each wavelength signal to a different photodetector. In the illustrative embodiment, each of four wavelength signals (each including a different one of blue, green, red, and near-infrared individual wavelength components) is directly routed to a different photodetector of a group of four photodetectors. The color-router is configured such that substantially all of the blue light incident on the pixel-repeat unit is selectively received at the first photodetector of the group, all of the green light incident on the pixel-repeat unit is selectively received at the second photodetector, all of the red light incident on the pixel-repeat unit is selectively received at the third photodetector, and all of the near-infrared light incident on the pixel-repeat unit is selectively received at the fourth photodetector. As a result, each pixel-repeat unit is able to provide spectrally selective detection with substantially perfect optical efficiency. Furthermore, because substantially all photons of each wavelength signal are directly routed to their respective photodetector, the color router additionally functions as both an anti-reflection layer and a lens element.

Each color router is a three-dimensional layer of substantially lossless silica containing an arrangement of nanoscale scatterers made of substantially lossless silicon nitride. The scatterers are configured such that their location, size, and shape enable each different wavelength signal in the received light to be completely directly routed to its corresponding photodetector. As a result, each photodetector receives substantially all of the optical energy of its respective wavelength signal and substantially none of the optical energy of the other wavelength signals.

In some embodiments, at least one of the substantially lossless medium and substantially lossless nanoscale scatterers comprises a different substantially lossless dielectric or other material, where the substantially lossless medium and substantially lossless nanoscale scatterers comprise materials having different dielectric constants.

In some embodiments, each of the light-detection layer and color router includes a different number of elements and/or the elements of each pixel-repeat unit are arranged in an arrangement other than that of a linear array, such as a 2×2 Bayer pattern, other two-dimensional arrangement (regular or irregular), and the like.

An embodiment in accordance with the present disclosure is an image-sensor pixel-repeat unit (100) for detecting each of a plurality of wavelength signals (106B, 106G, 106R, and 106NIR) in a light signal (106) incident on the pixel-repeat unit, wherein the image-sensor pixel-repeat unit comprises: a light-detection layer (102) comprising a plurality of photodetectors (110B, 110G, 110R, and 110NIR), the plurality of photodetectors being arranged in a first arrangement; and a color router (104) disposed on the light-detection layer, the color router comprising a first plurality of scatterers (408), wherein the first plurality of scatterers is arranged within the color router in a second arrangement, and wherein the color router comprises a first material (M1) having a first dielectric constant, and wherein each scatterer of the first plurality thereof comprising a second material (M2) having a second dielectric constant that is different than the first dielectric constant; wherein the second arrangement is configured such that the plurality of wavelength signals is directly routed to the plurality of photodetectors such that each photodetector of the plurality thereof selectively receives a different wavelength signal of the plurality thereof.

Another embodiment in accordance with the present disclosure is a method for forming an image-sensor pixel-repeat unit (100) for detecting each of a plurality of wavelength signals (106B, 106G, 106R, and 106NIR) in a light signal (106) incident on the pixel-repeat unit, wherein the method comprises: providing a light-detection layer (102) comprising a plurality of photodetectors (110B, 110G, 110R, and 110NIR), the plurality of photodetectors being arranged in a first arrangement; and forming a color router (104) on the light-detection layer, the color router comprising a first plurality of scatterers (408) that is arranged within the color router in a second arrangement, and wherein the color router comprises a first material (M1) having a first dielectric constant, and wherein each scatterer of the first plurality thereof comprising a second material (M2) having a second dielectric constant that is different than the first dielectric constant; and defining the second arrangement such that the color router directly routes the plurality of wavelength signals to the plurality of photodetectors such that each photodetector of the plurality thereof selectively receives a different wavelength signal of the plurality thereof.

BRIEF DESCRIPTION OF THE DRAWINGS

FIG. 2A depicts operations of an exemplary method suitable for forming a color router in accordance with the present disclosure.

FIG. 2B depicts operations of an exemplary alternative method suitable for forming a color router having multiple scatterer types, each having a different material composition, in accordance with the present disclosure.

FIGS. 6A-B depict spectral characteristics of the target design and corresponding optimized design response for wavelength signals 106B, 106G, 106R, and 106NIR routed by differently designed, fully binarized color router in accordance with the present disclosure.

DETAILED DESCRIPTION

Figure 1:
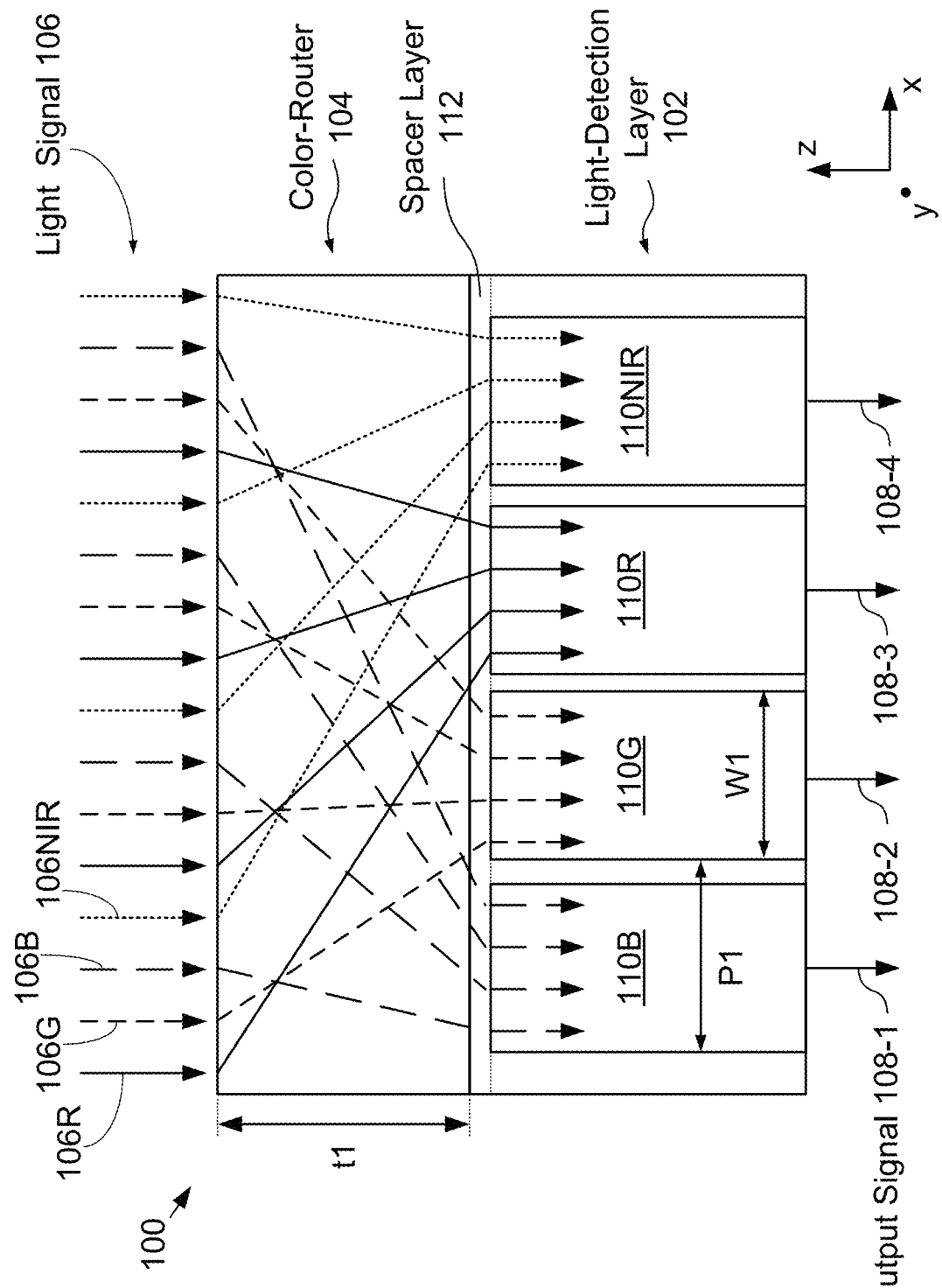
FIG. 1 depicts a schematic drawing of a cross-sectional view of an individual pixel-repeat unit of an illustrative embodiment of an image sensor in accordance with the present disclosure.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Unless otherwise explicitly specified herein, the figures comprising the drawing are not drawn to scale.

The following terms are defined for use in the present Specification, including the appended claims:

Disposed on or Formed on is defined as "exists on" an underlying material or layer. This layer may comprise intermediate layers, such as transitional layers, necessary to ensure a suitable surface. For example, if a material is described to be "disposed (or grown) on a substrate," this can mean that either (1) the material is in intimate contact with the substrate; or (2) the material is in contact with one or more transitional layers that reside on the substrate.

"Lossless material" is defined as a material that is substantially non-absorptive for the wavelength components included in a light signal.

"Wavelength component" is defined as a light signal that is centered at a particular wavelength. For example, a blue wavelength component is centered at approximately 450 nm, a green wavelength component is centered at 550 nm, and so on.

"Wavelength signal" is defined as an optical signal that includes at least one wavelength component. A wavelength signal in accordance with the present disclosure can include only one wavelength component (e.g., an individual blue, green, red, or near-infrared (NIR) wavelength component), or multiple wavelength components. It should be noted that multiple wavelength components included in a wavelength signal can be separated by uniform or nonuniform wavelength spacing without departing from the scope of the present disclosure.

"Directly routed" is defined as routing the photons of an optical signal through a color router such that they remain within the structure of the color router and emerge from the color router at or within one wavelength of their intended spatial location.

"Optical efficiency" is defined as the fraction (or percentage) of the optical power incident on the entire entry surface of the color router or pixel-repeat unit that is routed to the photodetector of the intended color channel.

FIG. 1 depicts a schematic drawing of a cross-sectional view of an individual pixel-repeat unit of an illustrative embodiment of an image sensor in accordance with the present disclosure. Pixel-repeat unit 100 includes light-detection layer 102 and color router 104, which is disposed directly on the light-detection layer. In some embodiments, a spacer layer is included between color router 104 and light detection layer 102. Pixel-repeat unit 100 is a spectrally selective detection system configured to individually detect the wavelength signals included in light signal 106. In the depicted example, light signal 106 contains wavelength signals 106R, 106G, 106B, and 106NIR, and pixel-repeat unit 100 provides output signals 108-1 through 108-4, which are based on the intensity of wavelength signals 106R, 106G, 106B, and 106NIR, respectively.

In the depicted example, each of wavelength signals 106R, 106G, 106B, and 106NIR includes only one individual wavelength component. Specifically, wavelength signal 106B includes only blue light (i.e., a narrow spectral band centered at 450 nm), wavelength signal 106G includes only green light (i.e., a narrow spectral band centered at 550 nm), wavelength signal 106R includes only red light (i.e., a narrow spectral band centered at 650 nm), and wavelength signal 106NIR includes only near-infrared light (i.e., a narrow spectral band centered at 750 nm). In some embodiments, at least one wavelength signal routed by a color router includes more than one wavelength component.

Light-detection layer 102 (hereinafter referred to as "LD layer 102") includes photodetectors 110B, 110G, 110R, and 110NIR, which are arranged in a linear array having uniform spacing or pitch P1 and size W1.

Photodetectors 110B, 110G, 110R, and 110NIR (referred to, collectively, as photodetectors 110) are conventional photodetectors suitable for detecting light having any wavelength component within the spectral range of light signal 106.

In the depicted example, each of photodetectors 110 has a size W1 of approximately 280 nm and pitch P1 is approximately 400 nm. It should be noted that this photodetector pitch is approximately half the photodetector pitch of state-of-the-art image sensors that employ absorption color filters, which have a photodetector pitch of approximately 800 nm. In some embodiments, the spacing between photodetectors 110B, 110G, 110R, and 110NIR is non-uniform. In some embodiments, pitch P1 is less than or equal to the wavelength of the longest wavelength component included in light signal 106. In some embodiments, the size of photodetectors 110B, 110G, 110R, and 110NIR is non-uniform. As will be apparent to one skilled in the art, after reading this Specification, the size, W1, of photodetectors 110 and the spacing between them (i.e., pitch P1) is a matter of design and any practical size and/or pitch can be used without departing from the scope of the present disclosure.

It should be noted that, although the depicted example operates over only a spectrum that visible and near-infrared light, embodiments in accordance with the present disclosure can be configured for operation at wavelengths within virtually any electromagnetic spectral range, such as infrared, ultraviolet, multiple spectral ranges, and the like.

Color router 104 has a structure that includes a layer of background medium having thickness t1, throughout which a three-dimensional arrangement of nanoscale scatterers is present. In the depicted example, thickness t1 is approximately 2 microns; however, color router 104 can have any practical thickness without departing from the scope of the present disclosure. Color router 104 is described in more detail below and with respect to FIGS. 2 through 5A-B. As discussed below, the material of the medium of color router 104 has a first dielectric constant, while the material of the scatterers comprise a different material that has a second dielectric constant that is different (higher or lower) than the first dielectric constant. As will be apparent to one skilled in the art, the dielectric constant and refractive index of a material are related, where the dielectric constant $\varepsilon_r$ is the refractive index squared, $\varepsilon_r = n^2$.

Color routers in accordance with the present disclosure afford significant advantages over prior-art optical stack elements (which can include, e.g., lenses, absorptive color filters, cavity spectral filters, anti-reflection coatings, etc.) and prior-art color-separation elements (which can include, e.g., plasmonic color filters, plasmonic photon sorters, diffractive optical filters, color splitters, etc.), including:

i. little or no optical crosstalk, enabling each photodetector to selectively receive virtually all of the optical energy of its respective wavelength signal; or ii. mitigation of reflections between the color router and the photodetectors and/or from the top surface of the color router by forming the color router directly on the photodetector surfaces; or iii. smaller photodetector sizes are possible due to the fact that the optical efficiency of the color router is significantly higher than prior-art elements; or iv. the use of photodetectors that are sub-wavelength in size because diffraction effects are mitigated by the fact that light does not need to propagate outside of a color router enroute to its corresponding photodetector; or v. significantly smaller size (i.e., color routers can be wavelength scale or smaller in height and/or width); or vi. they can have a wider spectral range and/or a variety of different spectral configurations, including the visible spectrum, ultraviolet, infrared spectrum, and the like; or vii. compatibility with conventional CMOS manufacture or other advanced nanofabrication methods; or viii. substantially perfect spectral color photon efficiency, substantially perfect broadband photon efficiency, substantially perfect spectral shape matching, and angular robustness are possible; or ix. any combination of i, ii, iii, iv, v, vi, vii, and viii.

Furthermore, it is an aspect of the present disclosure that the teachings herein enable a color router that directly routes the photons of a wavelength signal from the entry surface of the color router to their intended photodetector located at or within a wavelength of the exit surface of the color router. It should be noted that the direct-routing capability of color routers in accordance with the present disclosure is in direct contrast to meta-optics-based light-scattering structures, which rely on propagation of light over several wavelengths beyond the structures to focus and sort light spatially at the pixel photodetectors, such as those disclosed in U.S. Patent Publication No. 2020/0124866 or by P. Camayd-Munoz, et al., in "Multifunctional volumetric meta-optics for color and polarization image sensors," in Optica, Vol. 7, pp. 280-282 (2020), each of which is incorporated herein by reference.

FIG. 2A depicts operations of an exemplary method suitable for forming a color router in accordance with the present disclosure. Method 200 is described with continuing reference to FIG. 1, as well as reference to FIGS. 4A-C, which depict cross-sectional views of pixel-repeat unit 100 at different stages of fabrication.

Method 200 begins with operation 201, wherein a three-dimensional design for color router 104 is generated. In the depicted example, the design of color router 104 is realized via a computational approach that aims for systematic optimization of an objective function. This objective function can be related to the photon efficiency with which the light incident on the color router is separated and redirected to different photodetectors depending on its spectral content (color).

Figure 3:
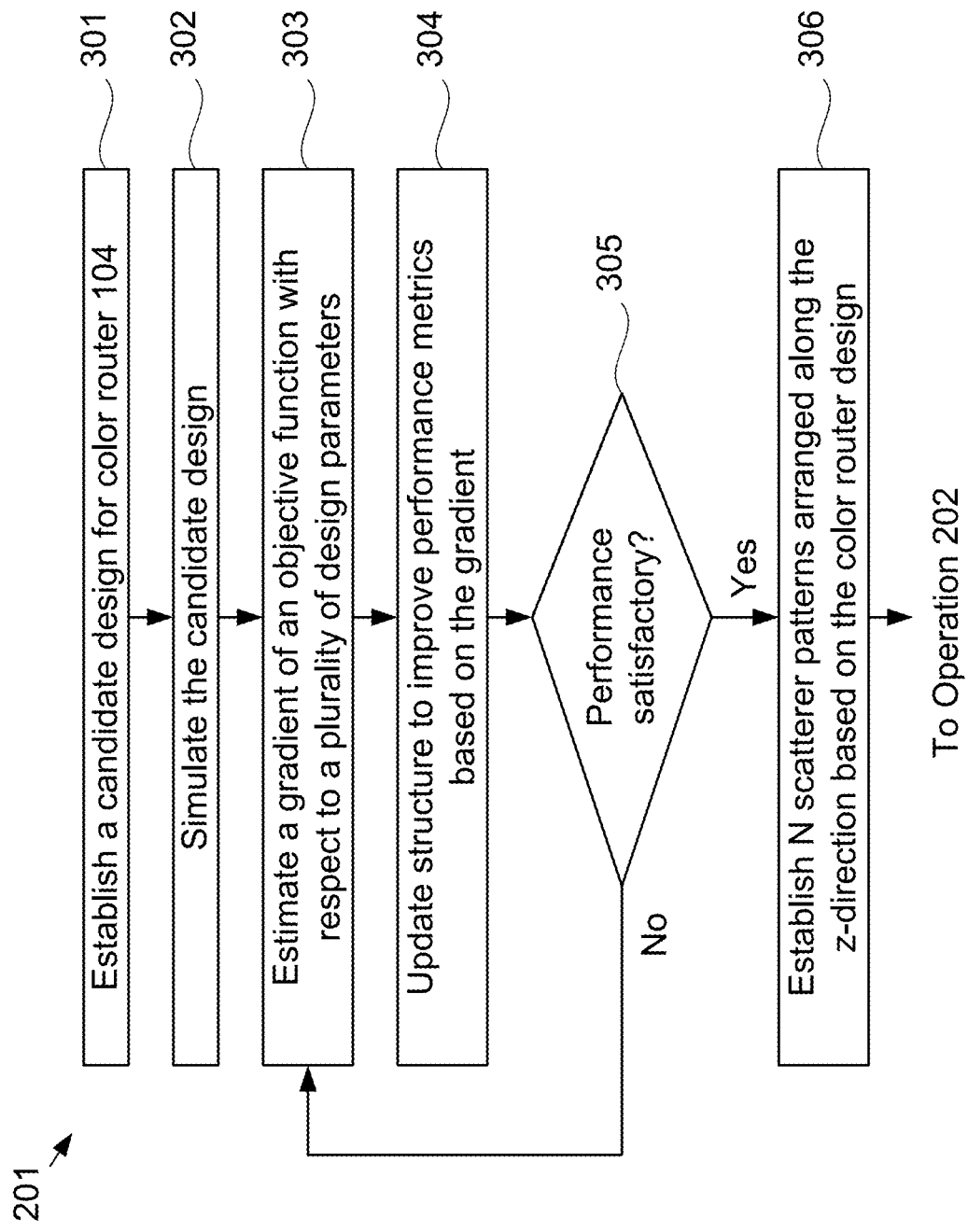
FIG. 3 depicts sub-operations of a non-limiting example of a sub-method suitable for designing a color router in accordance with the present disclosure.

FIG. 3 depicts sub-operations of a non-limiting example of a sub-method suitable for designing a color router in accordance with the present disclosure. Operation 201 begins with sub-operation 301, wherein a candidate design for color router 104 is established.

At sub-operation 302, the candidate design for color router 104 is simulated using an electromagnetic simulation. Examples of electromagnetic simulations suitable for use in accordance with the present disclosure include, without limitation, finite-difference time-domain, finite-difference frequency-domain, finite element, and the like.

At sub-operation 303, for the proposed color-router-structure design, an adjoint variable method is used to estimate the gradient of the objective function with respect to a plurality of design parameters. Preferably, this adjoint variable method includes at least two full electromagnetic simulations of the structure.

At sub-operation 304, the structure of the color router is updated along the direction of the gradient. It should be noted that any or all degrees of freedom in the color-router structure can be adjusted in parallel. Degrees of freedom are adjusted to respect bound constraints of the material dielectrics available for use in design region.

At sub-operation 305, this performance of the given color-router structure is evaluated against a set of performance metrics. Typically, these metrics primarily include routing efficiency into the desired channel, which, preferably, should be maximized while also measuring reflection and cross talk to attempt to minimize them. If the performance is deemed less than satisfactory, sub-method 300 returns to sub-operation 303. Note that sub-operations 303 through 305 can be iterated as many times as necessary to realize a color router design that is satisfactory.

If the performance satisfies the design criteria, however, sub-method 300 continues with sub sub-operation 306, in which a scatterer-pattern 410-$i$ is established for each of sub-layers 412-1 through 412-N, where each scatterer pattern includes a two-dimensional arrangement of scatterers that is based upon the position of its respective sub-layer within the arrangement of the N sub-layers along the z-direction.

The value of N depends on the desired performance for the color router, among other factors. Typically, has a value within the range of approximately 5 to approximately 40; however, any practical number of sub-layers, from just one layer to a few sub-layers to many dozen sub-layers or more, can be used in a color router without departing from the scope of the present disclosure.

It should be noted that, in some embodiments, the number, N, of sub-layers is established as part of sub-operation 301.

Returning now to method 200, for each of i=1 through N:

At operation 202, media layer 402-$i$ is formed. Media layer 402-$i$ comprises material M1, which has a first dielectric constant $\varepsilon_r=1$. In the depicted example, material M1 is silica having a dielectric constant of approximately 2.1. It should be noted that, preferably, photodetectors 110 are passivated by encasing them in dielectric material. In the depicted example, photodetectors 110 are encased in material M1, which also forms spacer layer 112. As a result, media layer 402-$i$ is formed on space layer 112.

At operation 203, a two-dimensional void pattern 404-$i$ of voids 406 is formed in media layer 402-$i$. The arrangement of void pattern 404-$i$ corresponds to the position of sub-layer 412-$i$ within the arrangement of the N sub-layers of color router 104, as determined in sub-operation 305, as discussed above. In the depicted example, voids 406 are approximately 10 nm by 10 nm in size (i.e., the design-element size is 10 nm by 10 nm), with abutting individual voids collectively defining larger features. It should be noted, however, that any suitable dimension for voids 406 can be used without departing from the scope of the present disclosure.

Figure 4A:
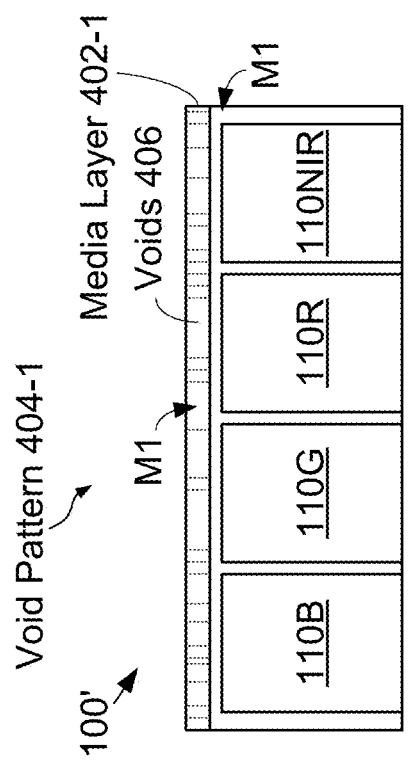
FIG. 4A shows a cross-sectional view of nascent pixel-repeat unit 100' after formation of void pattern 404-1.

FIG. 4A shows a cross-sectional view of nascent pixel-repeat unit 100' after formation of void pattern 404-1.

At operation 204, voids 406 are filled with material M2, which has a second dielectric constant, $\varepsilon_r=2$, to form scatterers 408, which have substantially the same dimensions as voids 406. Within each of layers 412-$i$, scatterers 408 are arranged in scatterer pattern 410-$i$, which matches void pattern 404-$i$. In the depicted example, material M2 is silicon nitride having a dielectric constant of approximately 4.0.

Figure 4B:
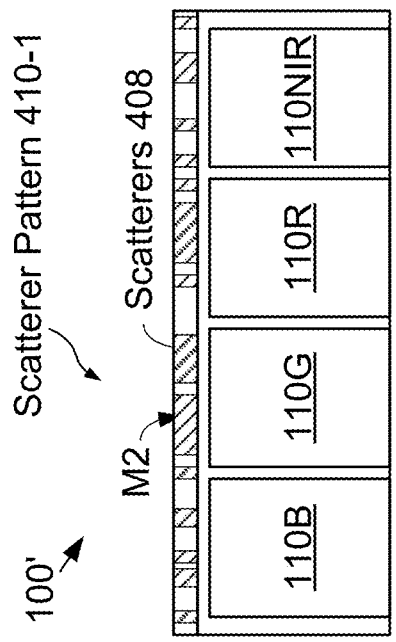
FIG. 4B shows a cross-sectional view of nascent pixel-repeat unit 100' after formation of scatterer pattern 410-1 in media layer 402-1.

FIG. 4B shows a cross-sectional view of nascent pixel-repeat unit 100' after formation of scatterer pattern 410-1 in media layer 402-1.

Once voids 406A contain material M2, media layer 402-$i$ and scatterer pattern 410A-$i$ collectively define sub-layer 412-$i$.

It should be noted that any of a wide range of suitable materials can be used for the materials included in color router 104. However, embodiments in accordance with the present disclosure derive significant advantages over the prior art by using lossless dielectric materials for the materials of color router 104. For example, the use of lossless materials enables all of the light incident on each pixel-repeat unit to be collected, while each wavelength signal is directly routed to a corresponding photodetector with nearly perfect optical efficiency. As a result, substantially lossless dielectric materials, such as silica, silicon oxides, silicon nitrides, silicon oxynitrides, titanium dioxide, hafnium oxide and the like, are typically preferred for operation in the visible spectrum. As will be apparent to one skilled in the art, after reading this Specification, the loss of a material is dependent upon the wavelength of operation; therefore, different dielectric materials, such as silicon, germanium, gallium phosphide, magnesium fluoride, zinc selenide, zinc sulfide, barium fluoride, calcium fluoride, sapphire, amorphous silicon dioxide are preferable for color routers designed for operation in other wavelength ranges, such as the ultraviolet wavelength range, mid-infrared wavelength range, long-infrared wavelength range, and the like.

At optional operation 205, sub-layer 412-$i$ is planarized.

Operations 202 through 205 are repeated N times such that sub-layers 412-1 through 412-N collectively define color router 104 and scatterer patterns 410-1 through 410-N collectively define three-dimensional scatterer arrangement 414.

Figure 4C:
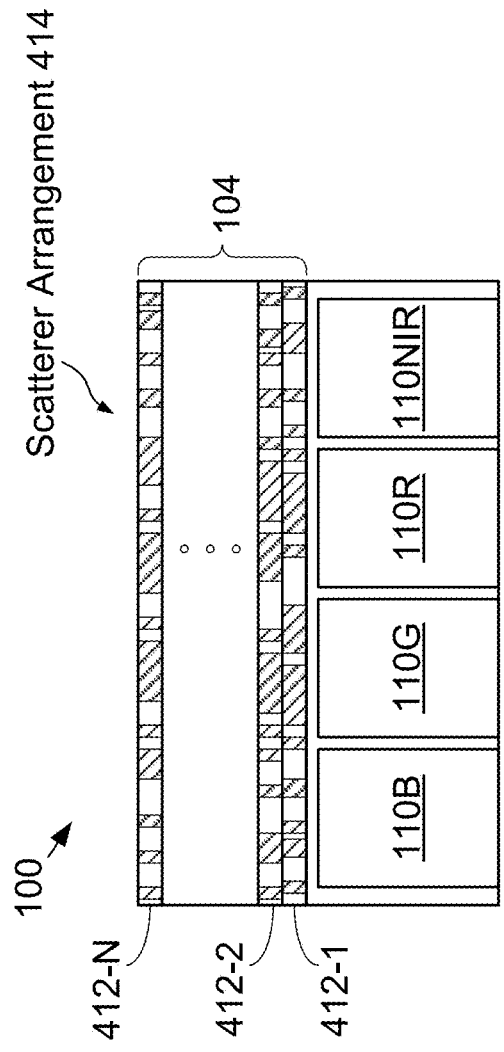
FIG. 4C shows a cross-sectional view of pixel-repeat unit 100 after completion of sub-layer 412-N and, therefore, color router 104.

FIG. 4C shows a cross-sectional view of pixel-repeat unit 100 after completion of sub-layer 412-N and, therefore, color router 104.

In the depicted example, color router 104 al of scatterers 408 comprise the same material. However, in some embodiments, scatterers in color router 104 are made of more than one material.

FIG. 2B depicts operations of an exemplary alternative method suitable for forming a color router having multiple scatterer types, each having a different material composition, in accordance with the present disclosure. Alternative method 200B is analogous to method 200A and begins with operations 201 and 202 described above.

It should be noted, however, that in method 200B, the design established for color router 104 includes arrangements for each of the m scatterer types included in the color router. As such, each of sub-layers 412-1 through 412-N generated via sub-method 300 includes a different scatterer pattern for each scatterer type.

For each of j=1 through m:

At operation 203B, void pattern 404-$i$-$j$, comprising voids 406-$j$ is defined in media layer 402-$i$.

At operation 204B, voids 406-$j$ are filled with material M2-$j$, to form scatterers 408-$j$, where each of materials M2-$j$ has a different dielectric constant that is also different than material M1. Scatterers 408-$j$ are arranged in scatterer pattern 410-$i$-$j$, which substantially matches void pattern 404-$i$-$j$. In the depicted example, m=2 and material M2-1 is silicon nitride and material M2-2 is silicon oxynitride.

Figure 4D:
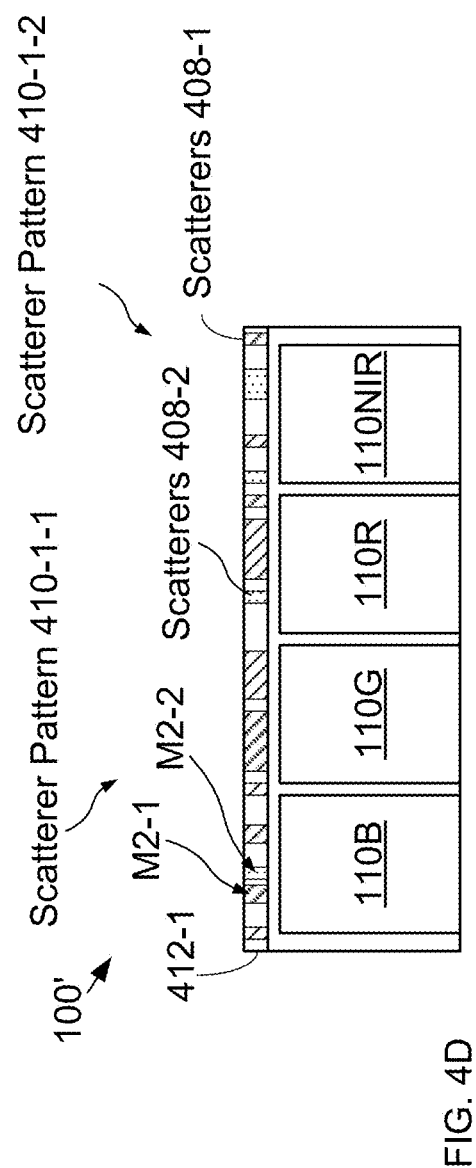
FIG. 4D shows a cross-sectional view of nascent pixel-repeat unit 100' after formation of scatterer patterns 410-1-1 through 410-1-2 in media layer 402-1.

FIG. 4D shows a cross-sectional view of nascent pixel-repeat unit 100' after formation of scatterer patterns 410-1-1 through 410-1-2 in media layer 402-1.

Upon completion of all m scatterer patterns in media layer 402-$i$, method 200B continues with operation 205 of method 200A, as described above.

In some embodiments, a three-dimensional design of a color router is established without employing a topographic approach in which it is segmented into a plurality of vertically arranged sub-layers. In some such embodiments, the three-dimensional arrangement of scatterers throughout color router 104 is fabricated using gray-scale lithographic and/or fabrication methods.

In some embodiments, color router 104 is fabricated by inducing a dielectric constant change at each of a plurality of voxel locations distributed throughout the three-dimensional volume of the layer. In some such embodiments, material M1 is a material whose dielectric constant can be altered by exposing it to an optical signal (e.g., an ultraviolet light beam, etc.) and each scatterer is produced by intersecting two light beams at the position of the scatterer. The intensity of each individual light beam is too low to induce a dielectric-constant change in material M1. However, at the crossing point of the light beams, the combined optical intensity is sufficient to induce a desired dielectric-constant change in material M1, thereby producing a scatterer at that point.

Figures 5A, 5B:
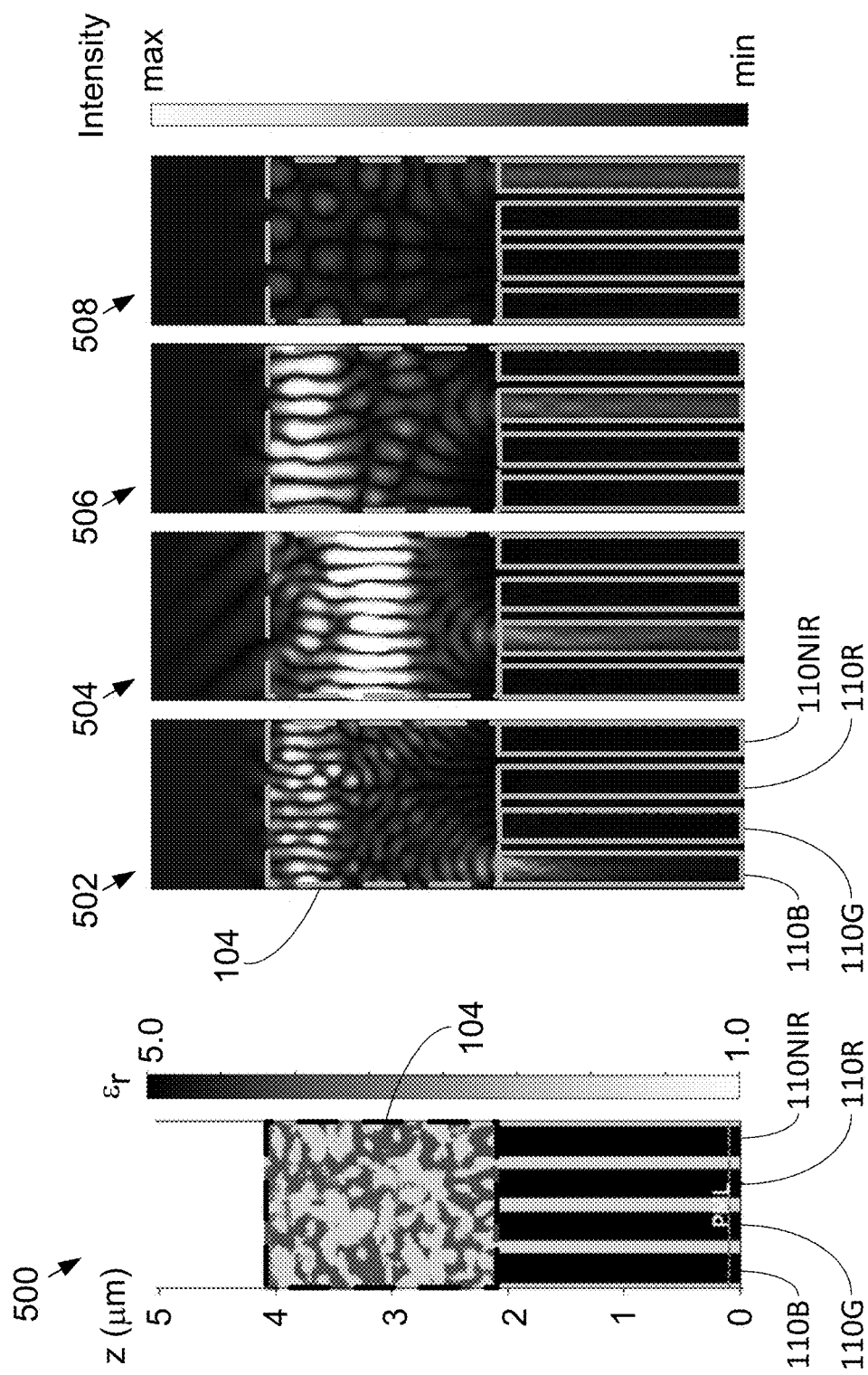
FIG. 5A depicts a plot of the dielectric constant throughout the structure of pixel-repeat unit 100.
FIG. 5B depicts field intensity plots showing the passage of each of the wavelength signals of light signal 106 through color router 104.

FIG. 5A depicts a plot of the dielectric constant throughout the structure of pixel-repeat unit 100.

FIG. 5B depicts field intensity plots showing the passage of each of the wavelength signals of light signal 106 through color router 104.

Plots 502, 504, 506, and 508 are intensity maps that show the paths of the photons of wavelength signals 106R, 106G, 106B, and 106NIR, respectively, through color router 104.

Table 1 shows the optical efficiency, and reflection for pixel-repeat unit 100.

| Wavelength Component | Optical Efficiency 110B (%) | Optical Efficiency 110G (%) | Optical Efficiency 110R (%) | Optical Efficiency 110NIR (%) | Reflection and Other Loss (%) |
|---|---|---|---|---|---|
| 106B | >99 | <1 | <1 | <1 | <1 |
| 106G | <1 | >99 | <1 | <1 | <1 |
| 106R | <1 | <1 | >99 | <1 | <1 |
| 106NIR | <1 | <1 | <1 | >99 | <1 |

As can be seen from Table 1, highly efficient routing and excellent optical efficiency can be achieved by color routers in accordance with the present disclosure. In fact, color router 104 exhibits substantially perfect optical routing of each of the wavelength signals of light signal 106 into their intended photodetectors, enabling pixel-repeat unit 100 to operate with substantially perfect optical efficiency (>99%) and substantially no optical crosstalk.

It should be noted that, in addition to directly routing the wavelength signals to their intended destinations, color router 104 is a multi-functional element that also replaces an anti-reflection coating and a microlens array. As a result, a color router in accordance with the present disclosure mitigates optical loss due to light reflection at the top surface of an image sensor, as well as from photons erroneously directed toward non-photosensitive regions of the image sensor (e.g., the regions between photodetectors 110). Such multifunctional capability is heretofore unknown in the prior art.

As will be apparent to one skilled in the art, absorption-based color filters are designed to achieve images with accurately rendered or pleasing colors. In fact, significant effort is directed to tuning the spectral response of absorbing color filters to facilitate color processing and digital image processing.

It is yet another aspect of the present disclosure that color router 104 can be designed such that its spectral response substantially matches a desired spectral template.

Specifically, in some embodiments, color router 104 is designed such that each of the wavelength components it routes has a desired spectral shape and center wavelength.

FIGS. 6A-B depict spectral characteristics of the target design and corresponding optimized design response for wavelength signals 106B, 106G, 106R, and 106NIR routed by differently designed, fully binarized color router in accordance with the present disclosure. In each case, the spectral characteristics for each wavelength component in wavelength signals 106B, 106G, 106R, and 106NIR is routed such that it has a desired spectral shape having a full-width at half-maximum (FWHM) about a center wavelength.

Plot 600 shows the performance of a first exemplary color router that routes wavelength signals 106B, 106G, 106R, and 106NIR such that they have a substantially Gaussian spectral shape having a FWHM of approximately 50 nm about center wavelengths of 450 nm, 550, nm, 650 nm, and 750 nm, respectively.

Plot 602 shows the performance of a second exemplary color router that routes wavelength signals 106B, 106G, 106R, and 106NIR such that they have a wider Gaussian spectral shape that has a FWHM of approximately 125 nm about the same center wavelengths.

It should be noted that, for each color router design, peak optical efficiency is within the range of 80-90%. As will be apparent to one skilled in the art, the theoretical limit, TL, of an absorbing-color-filter-based image sensor is 1/M, where M is the number of wavelength signals detected by a system. For a four-color image sensor that employs absorbing color filters, therefore, TL is 25%, which is well below the optical efficiency color channels in pixel-repeat unit 100.

Figure 7:
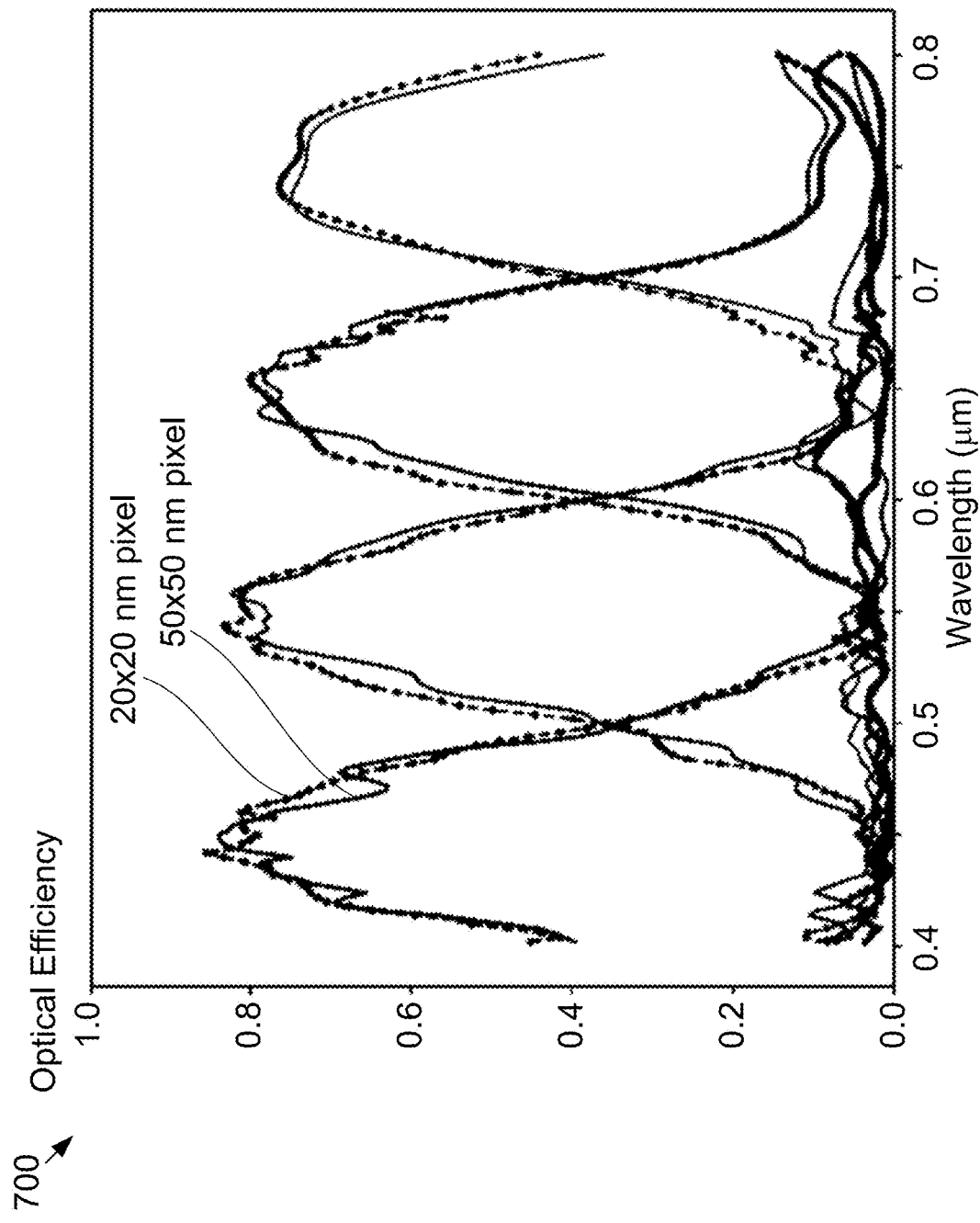
FIG. 7 depicts results demonstrating the effect of design-element size on the performance of a color router in accordance with the present disclosure.

FIG. 7 depicts results demonstrating the effect of design-element size on the performance of a color router in accordance with the present disclosure. Plot 700 shows spectra for wavelength signals 106B, 106G, 106R, and 106NIR for color routers having scatterers whose sizes are based on minimum feature sizes (i.e., design-element sizes) of 20 nm and 50 nm.

As is readily seen from plot 700, the spectral responses are nearly identical for both design-element sizes. Varying design-element size over the range of 10 nm to 50 nm, therefore, has little effect on overall color router efficiency or spectral bandwidth. It should be noted that the design elements can have any practical size and design element size is not limited to the range from 10 nm to 50 nm.

Figure 8:
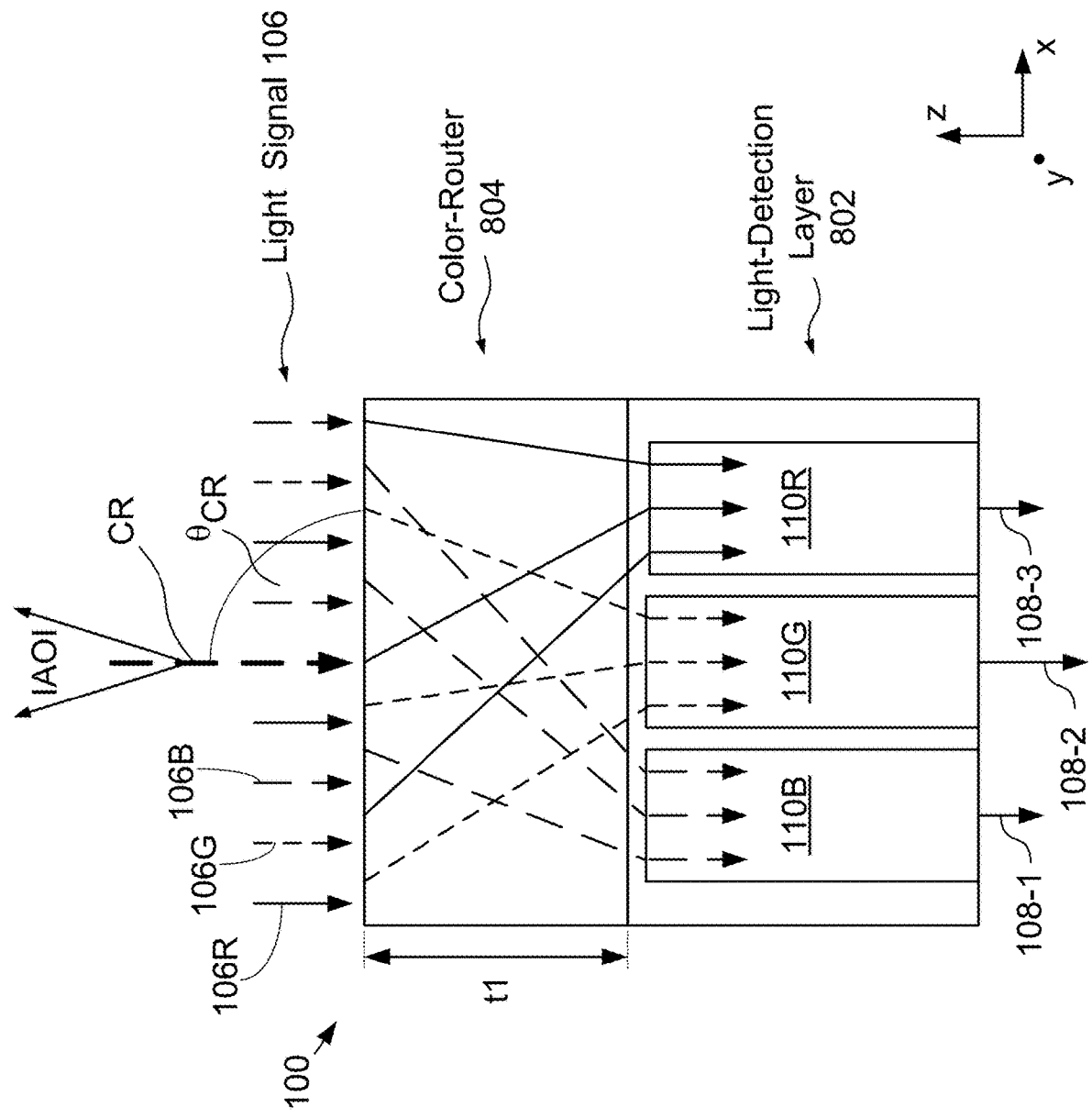
FIG. 8 depicts a schematic drawing of a cross-sectional view of an individual pixel-repeat unit of an alternative embodiment of an image sensor in accordance with the present disclosure.

FIG. 8 depicts a schematic drawing of a cross-sectional view of an individual pixel-repeat unit of an alternative embodiment of an image sensor in accordance with the present disclosure. Pixel-repeat unit 800 includes light-detection layer 802 and color router 804, which is disposed on the light-detection layer. Pixel-repeat unit 800 is analogous to pixel-repeat unit 100; however, pixel-repeat unit 800 is a three-photodetector arrangement for detecting only the blue, green, and red wavelength signals 106R, 106G, 106B of light signal 106.

Figure 9:
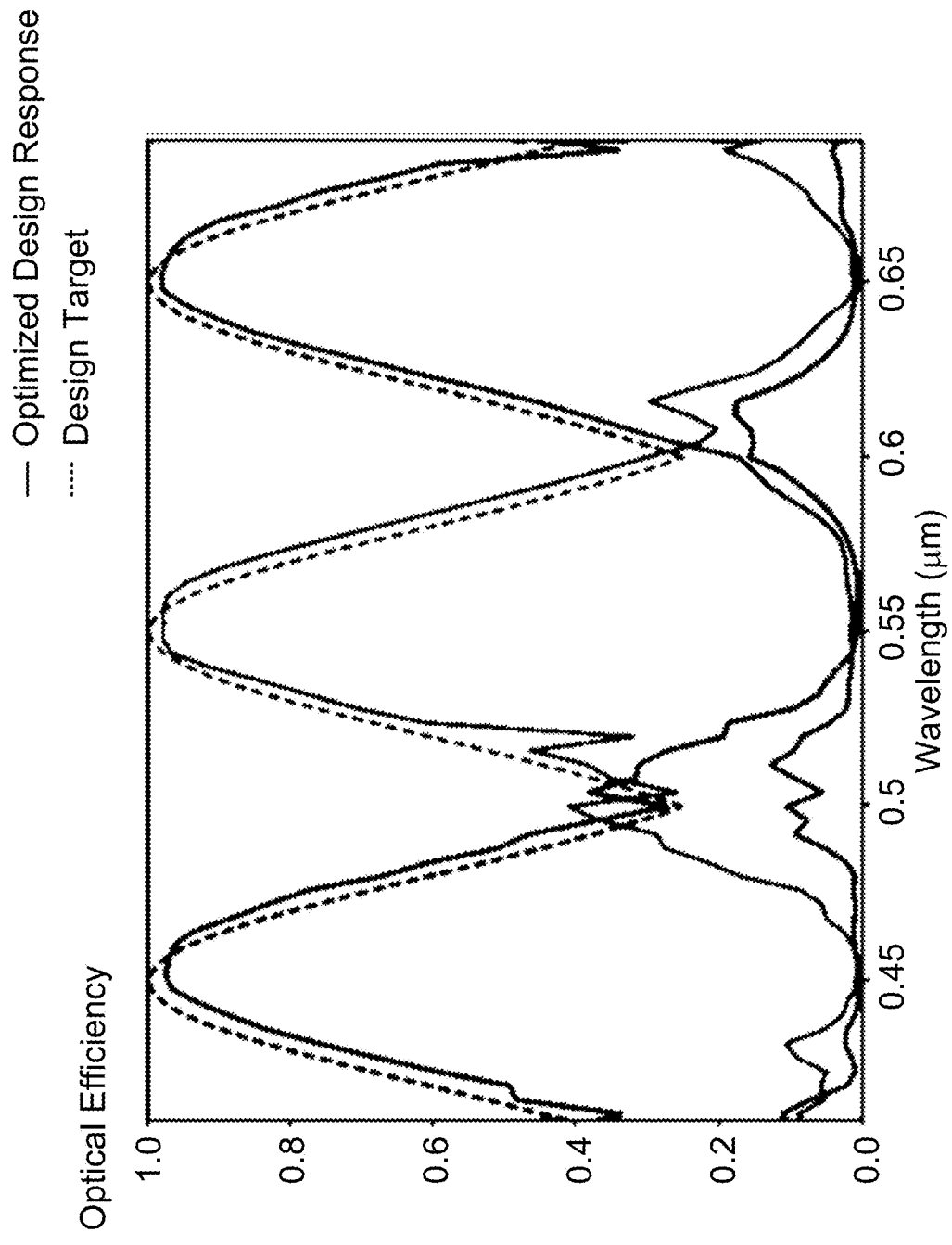
FIG. 9 depicts spectral characteristics of a target design and corresponding optimized design response for wavelength signals 106B, 106G, and 106R as directly routed by color router 804.

FIG. 9 depicts spectral characteristics of a target design and corresponding optimized design response for wavelength signals 106B, 106G, and 106R as directly routed by color router 804.

Plot 900 shows that wavelength signals 106B, 106G, and 106R are routed by color router 804 with peak optical efficiency that approaches 100%. Furthermore, it can be seen that the optimized design response and the design target are a nearly perfect match.

In some embodiments, an imaging system includes an imaging lens and a focal-plane array comprising a large number of pixel-repeat units arranged in a two-dimensional arrangement. The imaging lens, however, directs light toward each pixel-repeat unit, such that light received is characterized by a chief ray CR, which has an incidence angle $\theta_{CR}$ (as indicated in FIG. 8) on the color router, the magnitude of which is based upon the position of that pixel-repeat unit in the arrangement.

Furthermore, in some embodiments, one or more color routers of an array of pixel-repeat units is designed such that its functionality is tailored to the position of that pixel-repeat unit within a two-dimensional arrangement, which dictates the angle of incidence, $\theta_{CR}$, of light signal 106 at that pixel-repeat unit.

Figure 10:
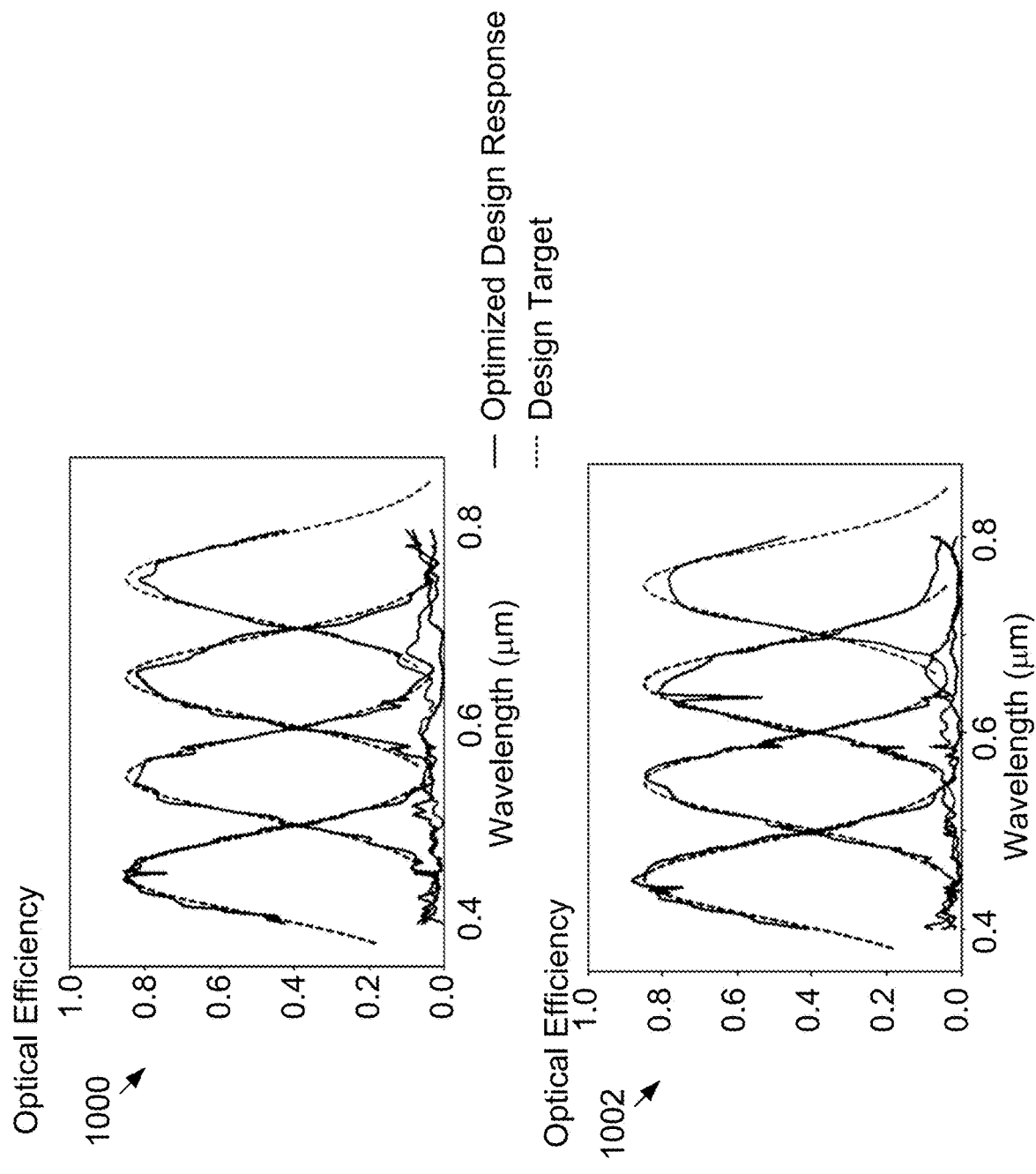
FIG. 10 depicts spectral characteristics of target designs and corresponding optimized design responses for two color routers designed for different incidence angles in accordance with the present disclosure.

FIG. 10 depicts spectral characteristics of target designs and corresponding optimized design responses for two color routers designed for different incidence angles in accordance with the present disclosure.

Plots 1000 and 1002 depicts the optical efficiency as a function of wavelength for color routers configured to route wavelength components 106B, 106G, 106R, and 106NIR when light signal 106 is received at incidence angles of 15° and 30°, respectively.

As can be seen from plots 1000 and 1002, the teachings of the present disclosure enable excellent spectral shape matching and high optical efficiency (i.e., >80%) to be realized even when light is received at incidence angles as large as 30 degrees, which provides significant flexibility in color-router design.

Figure 11:
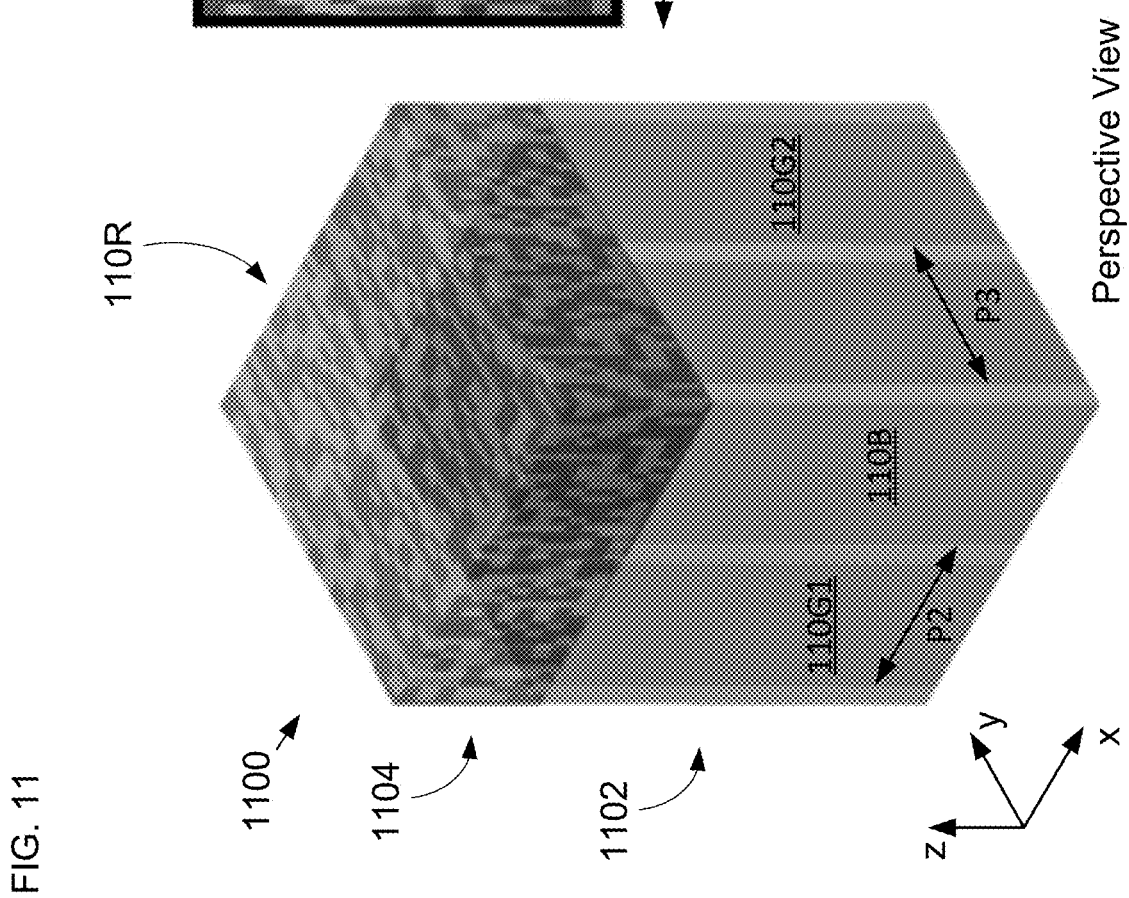
FIG. 11 depicts a schematic drawing of a cross-sectional view of an individual pixel-repeat unit of another alternative embodiment of an image sensor in accordance with the present disclosure.

FIG. 11 depicts a schematic drawing of a cross-sectional view of an individual pixel-repeat unit of another alternative embodiment of an image sensor in accordance with the present disclosure. Pixel-repeat unit 1100 includes light-detection layer 1102 and color router 1104, which is disposed on the light-detection layer. Pixel-repeat unit 1100 is analogous to pixel-repeat unit 100; however, pixel-repeat unit 1100 is a four-photodetector arrangement whose light-detection layer and color router are arranged in a two-dimensional pattern. In the depicted example, the two-dimensional pattern of photodetectors defines a red-green-green-blue Bayer mosaic pattern; however, a plurality of photodetectors can be arranged in any practical two-dimensional arrangement (e.g., regular array, irregular array, irregular arrangement, etc.) without departing from the scope of the present disclosure.

Light-detection layer 1102 (hereinafter referred to as "LD layer 1102") includes photodetectors 1108, 110G1, 110G2, and 110R, which are arranged in a 2×2 array having pitch P2 in the x-dimension and P3 in the y-dimension. It should be noted that, in some embodiments, photodetector pitch can be less than the wavelength of the light upon which the color router operates. In the depicted example, P2=P3=320 nm; however, in some embodiments, P2 and P3 are unequal and/or at least one of P2 and P3 has a value other than 320 nm.

Color router 1104 is analogous to color router 104; however, color router 1104 is configured to route the wavelength signals of light 106 according to a 2×2 Bayer color mosaic geometry.

Figure 12:
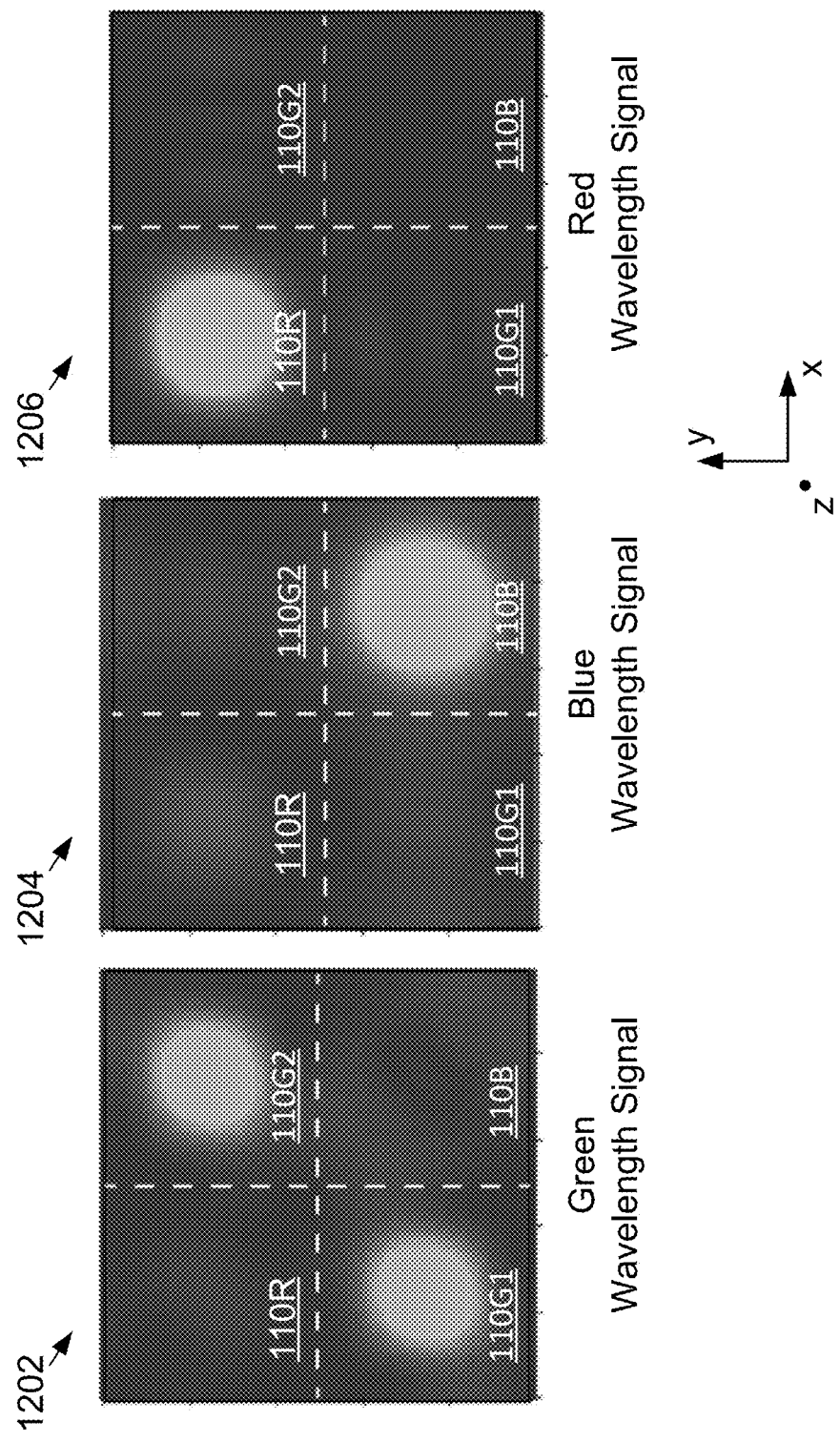
FIG. 12 depicts field intensity plots for the routing of the photons of the wavelength signals in light 106 by color router 1104.

FIG. 12 depicts field intensity plots for the routing of the photons of the wavelength signals in light signal 106 by color router 1104.

Plot 1202 is a field intensity plot showing green photons as redirected by color router 1104 and captured by photodetectors 110G1 and 110G2.

Plot 1204 is a field intensity plot showing blue photons as redirected by color router 1104 and captured by photodetector 110B.

Plot 1206 is a field intensity plot showing red photons as redirected by color router 1104 and captured by photodetector 110R.

Figure 13:
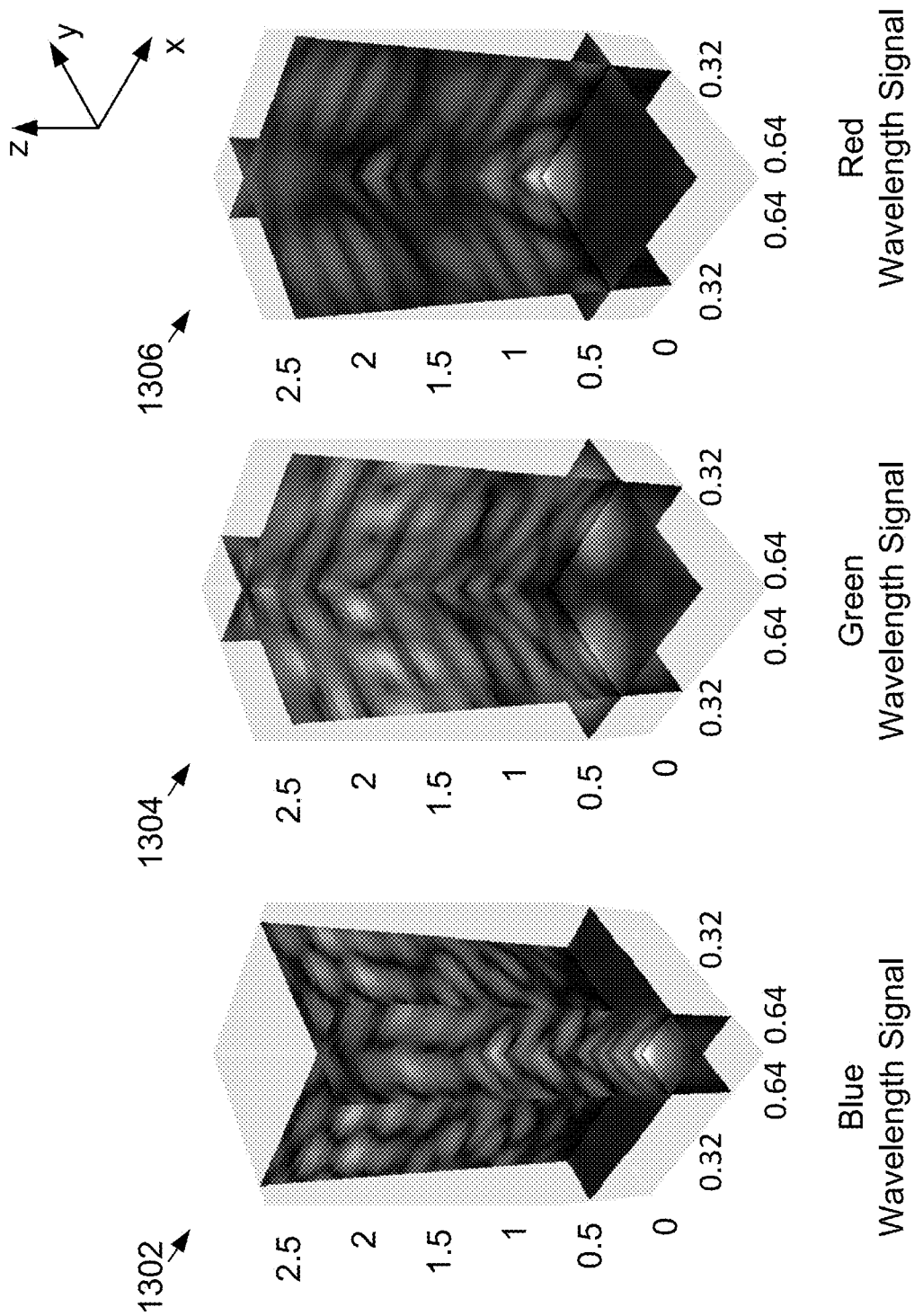
FIG. 13 depicts perspective views of field intensity plots showing the passage of each of the wavelength signals of light signal 106 through color router 1104.

FIG. 13 depicts perspective views of field intensity plots showing the passage of each of the wavelength components of light signal 106 through color router 1104. Plots 1300, 1302, and 1304 depict the three-dimensional field distributions for the routing of the blue, green, and red wavelength components through color router 1104 to photodetectors 110B, 110G1 and 110G2, and 110R, respectively.

It should be noted that the size of pixel-repeat unit 1000 is approximately 640 nm×640 nm, which is significantly smaller that can be realized using prior-art color-absorbing-filter based approaches.

Figure 14A:
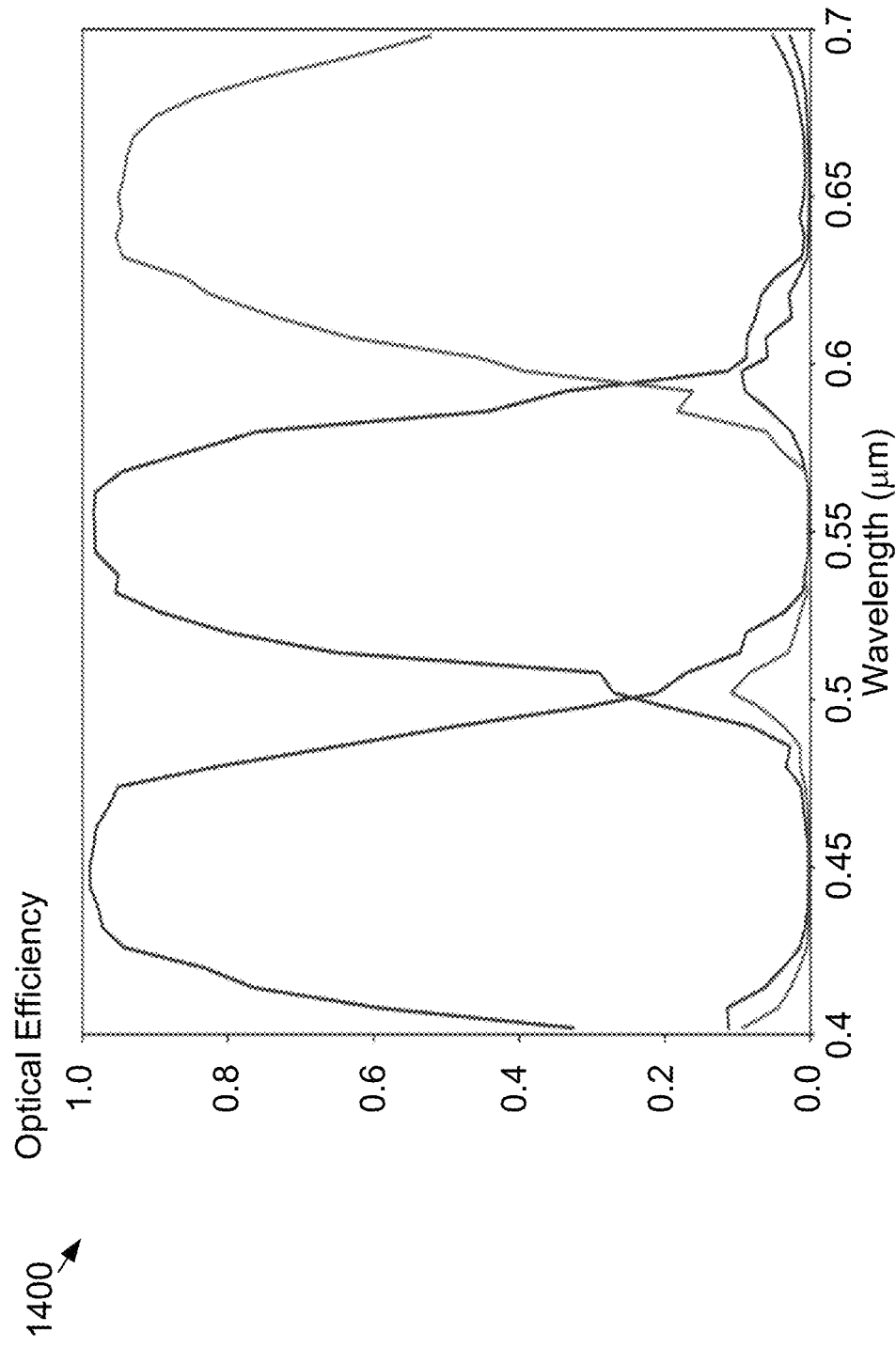
FIGS. 14A-B depict spectral characteristics of an optimized broadband response for unpolarized and polarized wavelength signals 106B, 106G, 106R, respectively, as directly routed in pixel-repeat unit 1100.
Figure 14B:
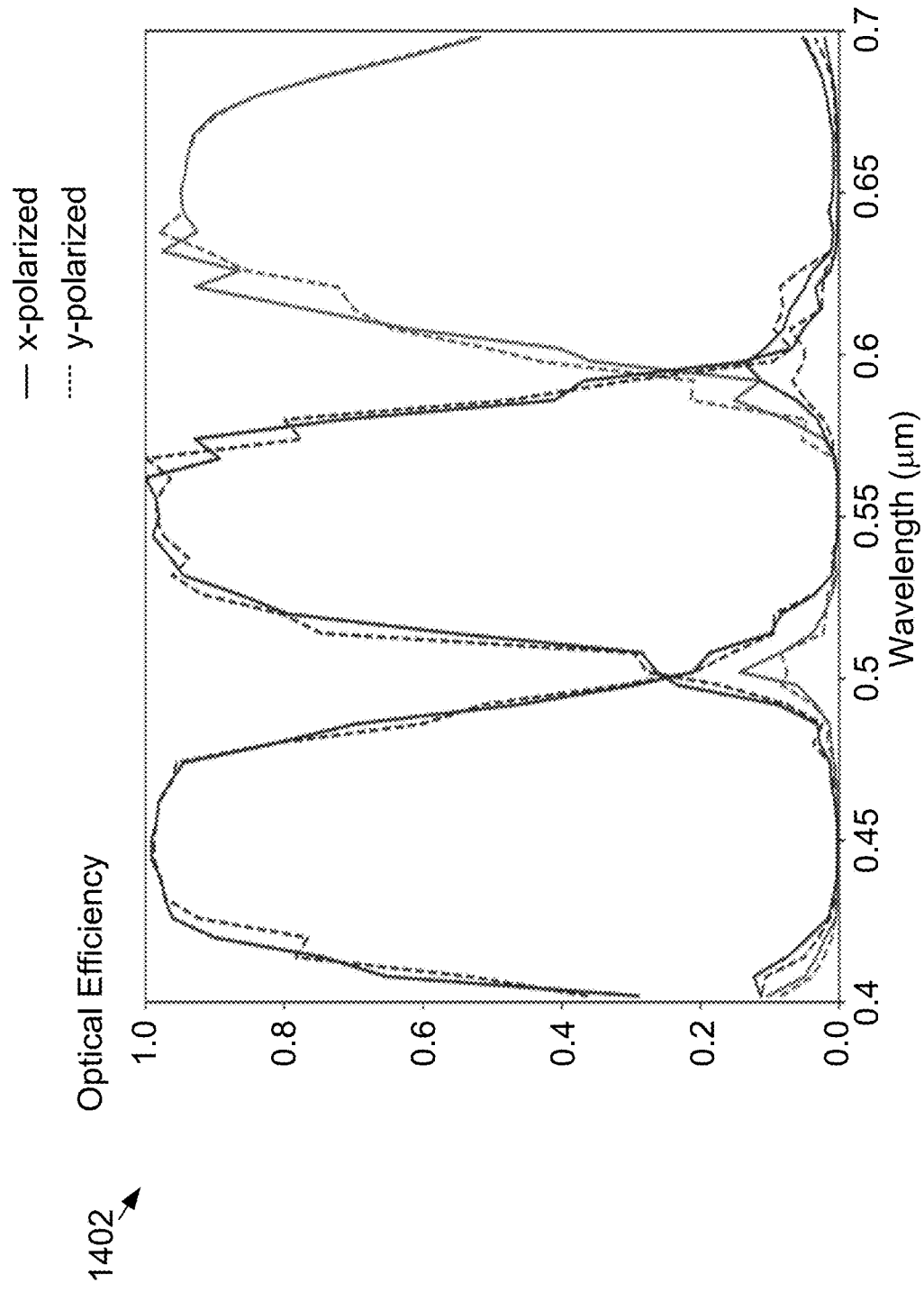

FIGS. 14A-B depict spectral characteristics of an optimized broadband response for unpolarized and polarized wavelength signals 106B, 106G, 106R, respectively, as directly routed in pixel-repeat unit 1100.

Plot 1400 shows that unpolarized wavelength components 106B, 106G, and 106R are routed by color router 1104 with peak optical efficiency that approaches 100%.

Plot 1402 shows that the routing of x- and y-polarized wavelength components 106B, 106G, and 106R are also routed by color router 1104 with peak optical efficiency that approaches 100% and with virtually no difference in the shapes of their spectra.

It is yet another aspect of the present disclosure that a color router can be configured such that it has a large acceptable included-angle-of-incidence (IAOI) for light signal 106, within which the color router enables very high optical efficiency.

Table 2 shows the optical efficiency of pixel-repeat unit 1100 for each of wavelength signals 106B, 106G, and 106R as a function of incidence angle range θ, corresponding to imaging lenses with different f/#.

| Wavelength Component | Optical Efficiency (%) θ = 0° | Optical Efficiency (%) f/8 θ = ±4° | Optical Efficiency (%) f/2.8 θ = ±10° | Optical Efficiency (%) f/2.0 θ = ±14° |
|---|---|---|---|---|
| 106B | >99 | >98 | >97 | >96 |
| 106G | >99 | >97 | >96 | >95 |
| 106R | >99 | >95 | >93 | >91 |

As can be seen from Table 2, each wavelength signal is directly routed through color router 1104 to their intended photodetectors with greater than 91% efficiency even at incident angles of up to 14° and with greater than 95% efficiency at incident angles of up to 4°. It should be noted that, even for large incident angles of up to 26° (which corresponds to an imaging lens with f/1.0, the lower limit of f/# for a typical practical imaging lens), color routers in accordance with the present disclosure still directly route wavelength signals to their intended photodetectors with better than 60% efficiency. It should be noted that these efficiencies are significantly higher than even the theoretical limit (25%) of absorbing-color-filter-based image sensors.

In some cases, a less complex fabrication process would be advantageous, as it would potentially enable lower cost image sensors. In some embodiments, therefore, surface optimization is used to produce a color router having only one layer.

Figure 15:
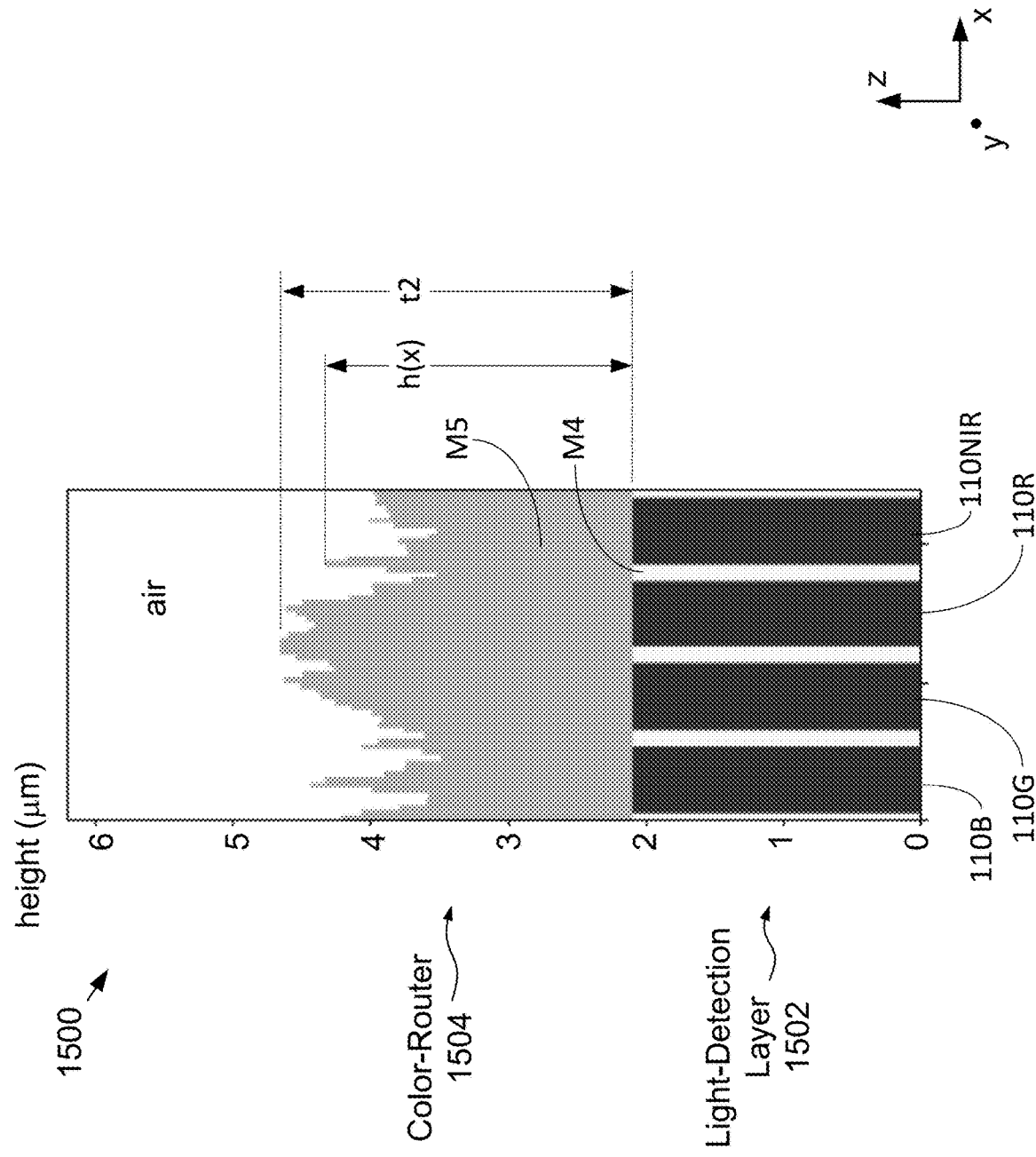
FIG. 15 depicts a schematic drawing of a cross-sectional view of an individual pixel-repeat unit of another alternative embodiment of an image sensor in accordance with the present disclosure.

FIG. 15 depicts a schematic drawing of a cross-sectional view of an individual pixel-repeat unit of another alternative embodiment of an image sensor in accordance with the present disclosure. Pixel-repeat unit 1500 includes light-detection layer 1502 and color router 1504, which is disposed directly on the light-detection layer.

Light-detection layer 1502 is analogous to light-detection layer 102; however, the photodetectors of light-detection layer 1502 are encased in material M3. In the depicted example, material M3 is silicon dioxide; however, any suitable dielectric material can be used without departing from the scope of the present disclosure.

Color router 1504 has maximum thickness, t2, and comprises a single layer of scatterers that are pillars of material M4, which has a fourth dielectric constant $\varepsilon_r=4$. The pillars of color router 1504 collectively define scatterer arrangement 1506, in which each pillar has the same lateral dimensions but a height that depends on the location of that pillar within the lateral extent of the scatterer arrangement. In the depicted example, material M4 is titanium dioxide having a dielectric constant of approximately 7.0.

The design of color router 1504 is realized via the adjoint variable method in which the dielectric function of the color router is expressed, in one dimension, as:

$$\epsilon(z, x) = \epsilon_{air} + \frac{\epsilon_r - \epsilon_{air}}{1 + e^{-G(x-h(x))}} \qquad (1)$$

where $\varepsilon_r$ is the dielectric constant of material M4, $\varepsilon_{air}$ is 1.0, and h(x) is the pillar height along the x direction.

In such a color router, the boundary of the surface normal to z is graded smoothly using a sigmoid function. By choosing a large enough G, the pillar edges approach a sharp boundary between the design material and air. In some embodiments, a Gaussian filter is used to smooth the function h(x) to realize reasonable aspect ratios.

Figure 16:
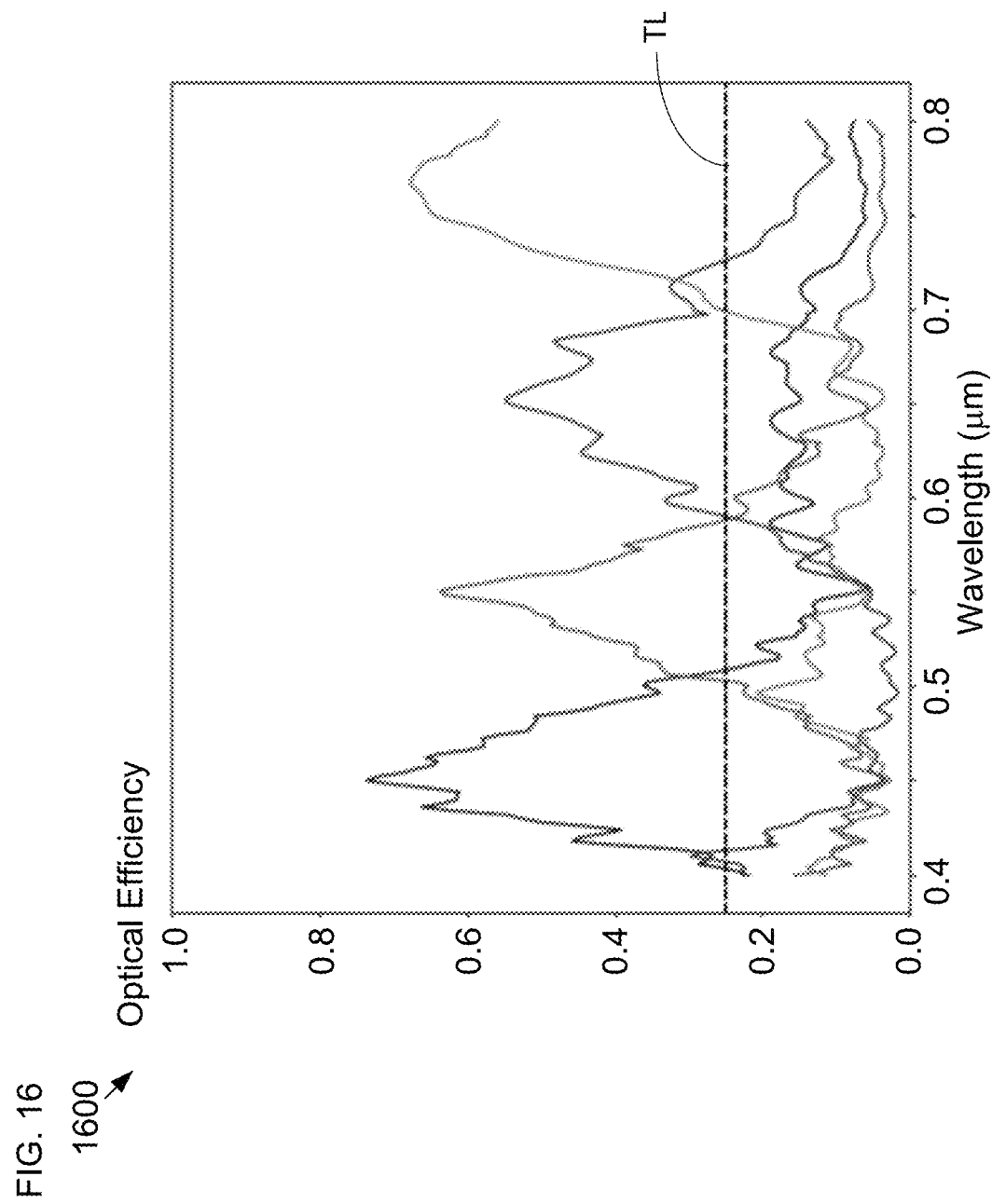
FIG. 16 shows a plot of the measured spectral response of surface-optimized color router in accordance with the present disclosure.

FIG. 16 shows a plot of the measured spectral response of surface-optimized color router in accordance with the present disclosure.

As is clear from plot 1600, the peak performance a surface-optimized color router is reduced relative to that of color router 104. However, as will be apparent to one skilled in the art, after reading this Specification, the performance of color router 1504 is significantly better than the absolute theoretical limit, TL, of 25% for absorbing-filter-based approaches.

It is to be understood that the disclosure teaches just some examples of embodiments in accordance with the present disclosure and that many variations can easily be devised by those skilled in the art after reading this disclosure without departing from its scope and, furthermore, that the scope of the present invention is to be determined by the following claims.

What is claimed is:

1. An image-sensor pixel-repeat unit (100) for detecting each of a plurality of wavelength signals (106B, 106G, 106R, and 106NIR) in a light signal (106) incident on the pixel-repeat unit, wherein the image-sensor pixel-repeat unit comprises:

a light-detection layer (102) comprising a plurality of photodetectors (110B, 110G, 110R, and 110NIR), the plurality of photodetectors being arranged in a first arrangement; and a color router (104) disposed on the light-detection layer, the color router comprising a background medium throughout which a three-dimensional arrangement of a first plurality of nanoscale scatterers (408), wherein the first plurality of scatterers is arranged within the color router in a second arrangement (414), and wherein the color router comprises a first material (M1) having a first dielectric constant, and wherein each scatterer of the first plurality of scatterers comprising a second material (M2) having a second dielectric constant that is different than the first dielectric constant;

wherein the second arrangement is configured such that the plurality of wavelength signals is directly routed to the plurality of photodetectors such that each photodetector of the plurality of photodetectors selectively receives a different wavelength signal of the plurality of wavelength signals.

2. The element of claim 1 wherein the first arrangement is selected from the group consisting of a linear arrangement and a two-dimensional arrangement.

3. The element of claim 1 wherein the plurality of wavelengths is characterized by a longest wavelength, and wherein the first arrangement has a first pitch (P1) in at least one dimension that is less than or equal to the longest wavelength.

4. The element of claim 1 wherein the color router further includes a second plurality of scatterers (408-2), each scatterer of the second plurality of scatterers comprising a third material (M2-2) having a third dielectric constant that is different than the first dielectric constant.

5. The element of claim 1 wherein the first arrangement is a 2×2 array.

6. The element of claim 5 wherein the light-detection layer and color router collectively define a Bayer color mosaic geometry.

7. The element of claim 1 wherein the color router includes a plurality of sub-layers (412-1 through 412-N), each sub-layer including a scatterer pattern (410-1 through 410-N) comprising scatterers of the first plurality of scatterers, wherein the scatterer pattern (410-1) of a first sub-layer (412-1) of the first plurality of scatterers is different than the scatterer pattern (410-2) of a second sub-layer (412-2) of the first plurality of scatterers.

8. The element of claim 1 wherein first dielectric constant is higher than the second dielectric constant.

9. The element of claim 1 wherein color router is configured to at least one of (1) mitigate reflection of the light signal and (2) route each wavelength signal of the plurality of wavelength signals entirely to a different photodetector of the plurality of photodetectors.

10. The element of claim 1 wherein the color router is polarization independent.

11. The element of claim 1 wherein the light signal is received at an angle of incidence (qcR), and wherein, when the angle of incidence is within the range of +26° to −26°, the color router directly routes each of the plurality of wavelengths to the photodetector that selectively receives the different wavelength signal of the plurality of wavelength signals with an optical efficiency that is at least 60%.

12. An image-sensor pixel-repeat unit (100) for detecting each of a plurality of wavelength signals (106B, 106G, 106R, and 106NIR) in a light signal (106) incident on the pixel-repeat unit, wherein the image-sensor pixel-repeat unit comprises:

a light-detection layer (102) comprising a plurality of photodetectors (110B, 110G, 110R, and 110NIR), the plurality of photodetectors being arranged in a first arrangement; and a color router (104) disposed on the light-detection layer, the color router comprising a background medium throughout which a three-dimensional arrangement of a first plurality of nanoscale scatterers (408), wherein the first plurality of scatterers is arranged within the color router in a second arrangement (414), and wherein the color router comprises a first material (M1) having a first dielectric constant, and wherein each scatterer of the first plurality of scatterers comprising a second material (M2) having a second dielectric constant that is different than the first dielectric constant;

wherein the second arrangement is configured such that the plurality of wavelength signals is directly routed to the plurality of photodetectors such that each photodetector of the plurality of photodetectors selectively receives a different wavelength signal of the plurality of wavelength signals;

wherein the color router (1006) has a first thickness (t2), and wherein each of the first plurality of scatterers is a column having a height (h(x)) less than or equal to the first thickness, and wherein the height of each of the first plurality of scatterers is based on a position of each of the first plurality of scatterers within the color router.

13. An image-sensor pixel-repeat unit (100) for detecting each of a plurality of wavelength signals (106B, 106G, 106R and 106NIR) in a light signal (106) incident of the pixel-repeat unit, wherein the image-sensor pixel-repeat unit comprises:

a light-detection layer (102) comprising a plurality of photodetectors (110B, 110G, 110R, and 110NIR), the plurality of photoreactors being arranged in a first arrangement; and a color router (104) disposed on the light-detection layer, the color router comprising a background medium throughout which a three-dimension arrangement of a first plurality of nanoscale scatters (408), where the first plurality of scatters is arranged within the color router in a second arrangement (414), and wherein the color router comprises a first material (M1) having a first dielectric constant, and wherein each scatterer of the first plurality of scatterers comprising a second material (M2) having a second dielectric constant that is different that the first dielectric constant;

wherein the second arrangement is configured such that the plurality of wavelength signals is directly routed, without passing through a filter, to the plurality of photoreactors such that each photoreceptor of the plurality of photodetectors selectely receives a different wavelength signal of the plurality of wavelength signals.

* * * * *